(12) United States Patent
Trachtenberg et al.

(10) Patent No.: US 8,130,256 B2
(45) Date of Patent: Mar. 6, 2012

(54) TELEPRESENCE CONFERENCE ROOM LAYOUT, DYNAMIC SCENARIO MANAGER, DIAGNOSTICS AND CONTROL SYSTEM AND METHOD

(75) Inventors: Marc Trachtenberg, New York, NY (US); Steven Gage, Merrick, NY (US); Karl Krantz, Stamford, CT (US)

(73) Assignee: Teliris, Inc., New York, NY (US)

( * ) Notice: Subject to any disclaimer, the term of this patent is extended or adjusted under 35 U.S.C. 154(b) by 548 days.

(21) Appl. No.: 12/254,075

(22) Filed: Oct. 20, 2008

(65) Prior Publication Data

US 2009/0051756 A1 Feb. 26, 2009

Related U.S. Application Data

(63) Continuation of application No. PCT/US2008/054013, filed on Feb. 14, 2008.

(60) Provisional application No. 60/889,807, filed on Feb. 14, 2007.

(51) Int. Cl.
*H04N 7/14* (2006.01)
(52) U.S. Cl. ...................................... 348/14.08; 709/204
(58) Field of Classification Search ..... 348/14.01–14.08
See application file for complete search history.

(56) References Cited

U.S. PATENT DOCUMENTS

| | | | |
|---|---|---|---|
| 4,847,829 A * | 7/1989 | Tompkins et al. | 370/260 |
| 6,922,718 B2 * | 7/2005 | Chang | 709/204 |
| 7,456,858 B2 * | 11/2008 | Schrader et al. | 348/14.09 |
| 7,477,281 B2 * | 1/2009 | Chandra et al. | 348/14.09 |
| 7,773,581 B2 * | 8/2010 | Punj et al. | 370/352 |
| 8,065,614 B2 * | 11/2011 | Ma et al. | 715/723 |
| 2002/0196328 A1 * | 12/2002 | Piotrowski | 348/14.12 |
| 2003/0149724 A1 * | 8/2003 | Chang | 709/204 |
| 2004/0119814 A1 | 6/2004 | Clisham et al. | |
| 2005/0197877 A1 * | 9/2005 | Kalinoski | 705/8 |
| 2006/0028983 A1 | 2/2006 | Wright | |
| 2006/0256187 A1 | 11/2006 | Sheldon et al. | |
| 2006/0284786 A1 | 12/2006 | Takano et al. | |
| 2008/0136896 A1 * | 6/2008 | Graham et al. | 348/14.08 |
| 2008/0215409 A1 * | 9/2008 | Van Matre | 705/8 |

FOREIGN PATENT DOCUMENTS

| | | |
|---|---|---|
| EP | 0351757 A2 | 1/1990 |
| EP | 0724362 A1 | 7/1996 |
| WO | 2008101117 A1 | 8/2008 |

OTHER PUBLICATIONS

International Search Report; PCT/US08/54013; May 9, 2008; 1 page.
European Search Report; Application No. EP 08 72 9907; Nov. 22, 2010; 8 pages.

* cited by examiner

*Primary Examiner* — Curtis Kuntz
*Assistant Examiner* — Maria El-Zoobi
(74) *Attorney, Agent, or Firm* — St. Onge, Steward, Johnston & Reens LLC

(57) ABSTRACT

A method, system and apparatus for conducing an audio-visual telepresence conference among a number of conference rooms distributed over various locations includes determining a priority of each room in the conference, determining an optimal number of audio-video streams between each room in the conference according to priority, assigning participant displays and participant cameras to other rooms in the conference according to priority, generating and transmitting a configuration script for each room in the conference, performing audio and video diagnostic procedures between each room in the conference, and managed, remote control and monitoring of the conference.

10 Claims, 10 Drawing Sheets

TELEPRESENCE CONFERENCE ROOM LAYOUT, DYNAMIC SCENARIO MANAGER, DIAGNOSTICS AND CONTROL SYSTEM AND METHOD

RELATED APPLICATION

This is a continuation of PCT/US08/54013, filed Feb. 14, 2008, which claims the priority of U.S. Provisional Patent Application Ser. No. 60/889,807, filed Feb. 14, 2007.

FIELD OF THE INVENTION

This invention pertains to the field of teleconferencing and telepresence systems and methods and, in particular, to dynamic teleconferencing and telepresence systems and methods encompassing multiple locations.

BACKGROUND AND SUMMARY OF THE INVENTION

Audio/video teleconferencing has become an important and effective method of communication between individuals and groups over great distances. While prior ("legacy") audio/video teleconferencing systems have provided improvements over audio-only conferencing methods (for example, telephone conferencing), the difference between in-person conferences and the legacy audio/video teleconference systems remains substantial.

It is known that a significant amount of communication between individuals occurs in non-verbal form (such as eye contact, facial expressions, "body language", hand gestures, and other non-verbal cues). It has been found that the legacy teleconferencing systems do not effectively convey such non-verbal communication. Thus, there is a need for an improved teleconferencing system and method that more closely imitates an in-person conference.

The telepresence system and method of the present invention fulfill the need for an improved audio/video teleconferencing system by providing telepresence conference rooms which closely mimic an in-person conference, and by providing a system and method for automatically operating conferences held between such telepresence conference rooms, including the scheduling, configuration, initiation, diagnosis, monitoring, fault correction, and termination of such conferences. The telepresence system and method may also incorporate legacy teleconference rooms into a telepresence conference.

BRIEF DESCRIPTION OF THE DRAWINGS

For a complete understanding of the above and other features of the invention, reference shall be made to the following detailed description of the preferred embodiments of the invention and to the accompanying drawings, wherein.

DETAILED DESCRIPTION OF THE PREFERRED EMBODIMENTS

A. Telepresence Conference Room Layout

Figure 1:
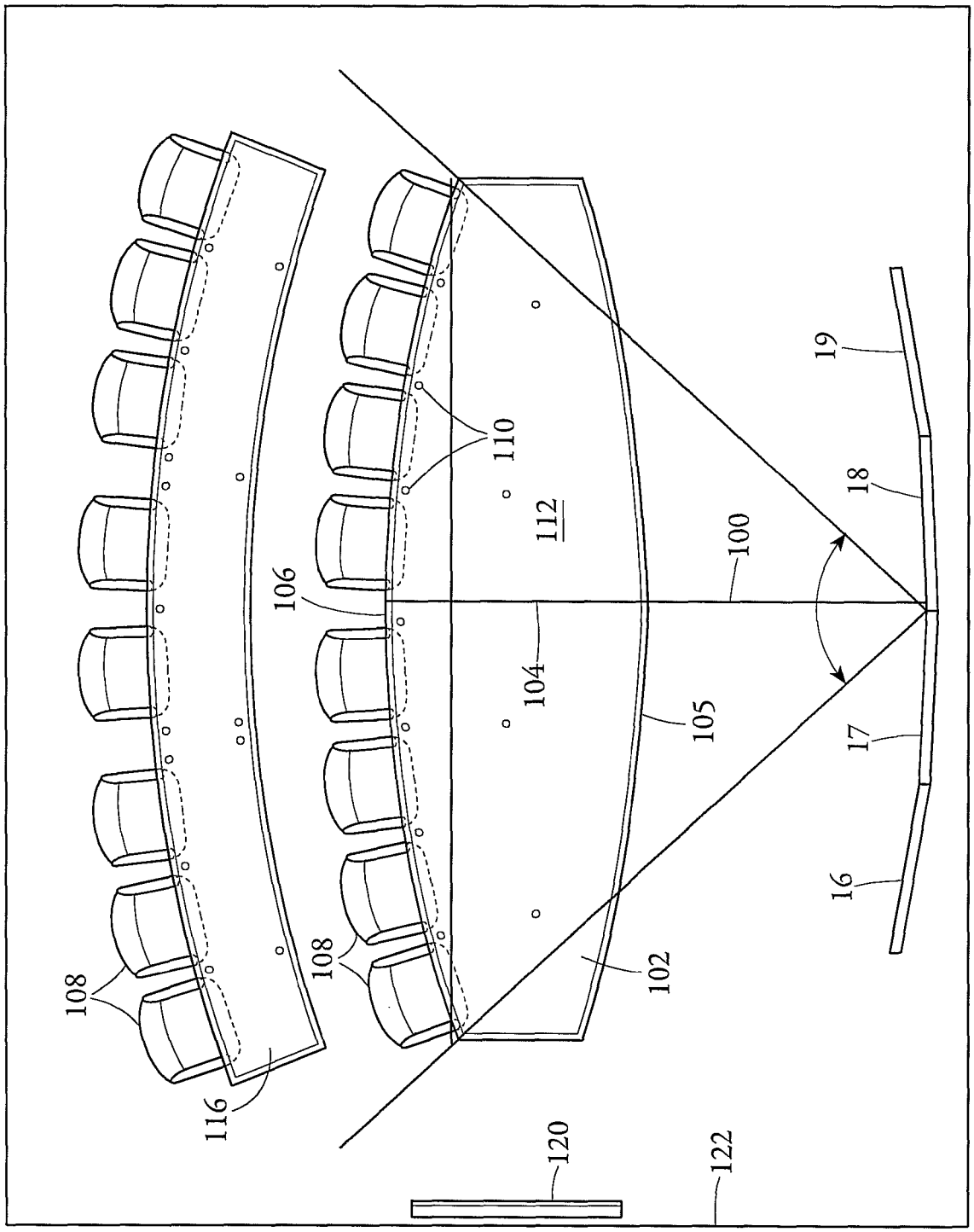
FIGS. 1-5 are plan views of telepresence conference rooms constructed in accordance with the invention.
Figure 2:
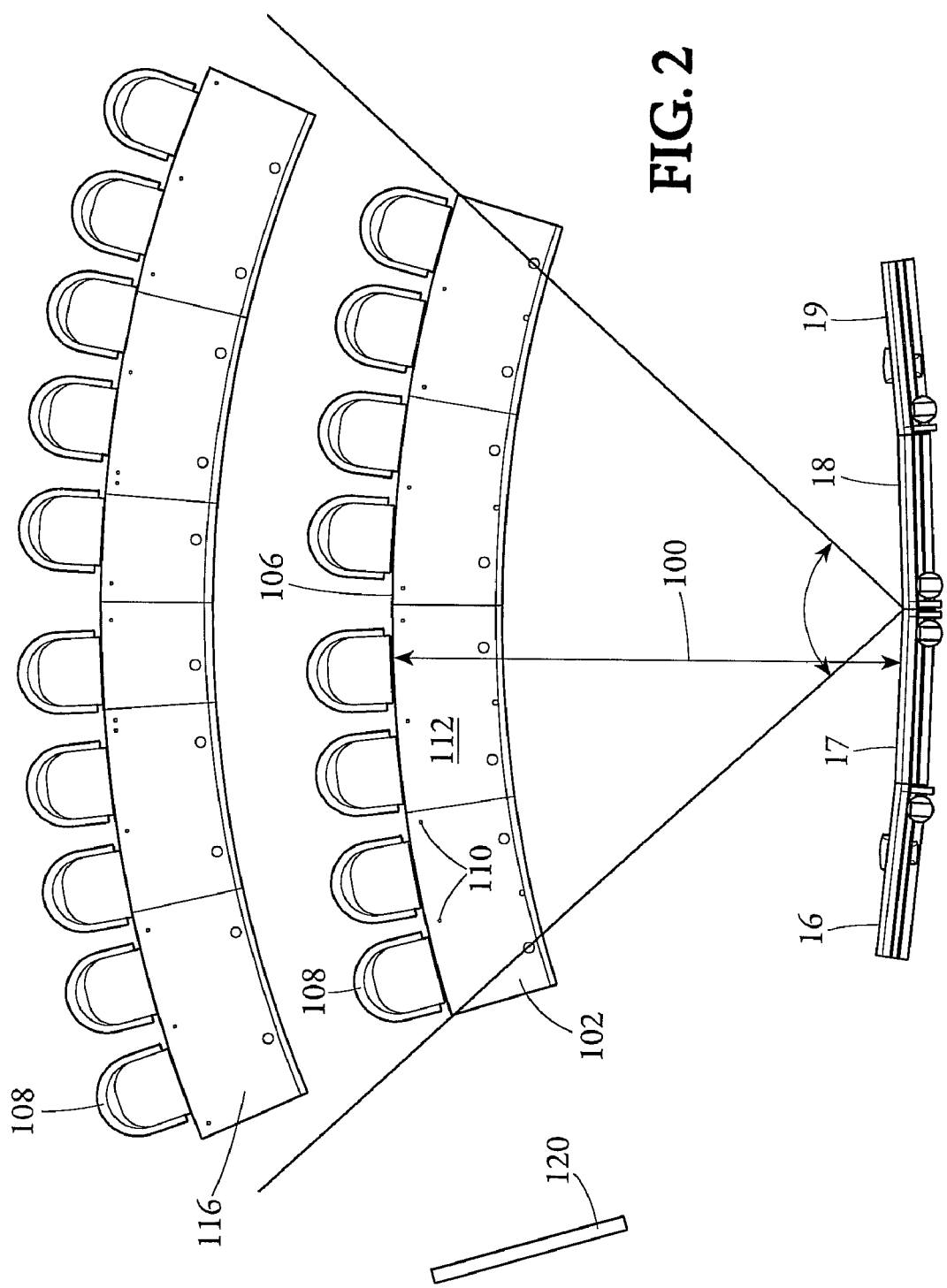

Referring to FIGS. 1 and 2, telepresence conference rooms of the present invention are carefully designed to closely mimic an in-person conference held at a conference table. To closely mimic an in-person conference, most of the attributes of the telepresence room are carefully predetermined and controlled, including the general room layout, the table size, shape and position, the maximum number of participants and their seating positions, the number, size and location of participant displays, the location of any alternative display(s) (e.g., laptop computer presentation screens), the location of any lecterns, the lighting controls, the microphone and speaker placement, the room acoustics, the operation of windows and shades, the cabling, the climate, the color, pattern and texture of walls, the furniture and other room surfaces, and the overall aesthetics of the room.

The room layout is affected by a number of factors, including the number of participants at a room, the size of the conference table, the angle of the view of the cameras, the amount and type of the video displays, whether the displays are mounted on a wall or on a free-standing support, and other factors.

Participant Displays

Each telepresence conference room of the present invention has a plurality of large, flat-screen participant displays 16, 17, 18, 19 mounted to a wall or to a free-standing support structure. Preferably, each participant display is a high-definition, wide-format (16:9 aspect ratio), LCD or plasma display and is substantially identical in size and appearance to the other participant displays in the room. Preferably the participant displays have a diagonal active display dimension of about 42", 57" or 70".

The participant displays 16, 17, 18, 19 in a given telepresence room are preferably mounted at a consistent, predetermined height off of the floor such that the bottom of the active display area of each participant display is about equal in height to the top of the conference table, or, between about 27 inches (68.5 cm) and about 30 inches (76.2 cm) off of the floor.

Preferably, there are at least four such participant displays in each telepresence room, with two "central" participant displays 17, 18 arranged symmetrically on either side of a longitudinal (front-to-back) axis of symmetry 100 of the telepresence room, and further participant displays located on either sides of the central participant displays. Alternatively, there may be 1, 2, 3 or 5 participant displays. The participant displays are arranged such that adjacent displays closely abut one another, thereby forming a horizontally-elongated, contiguous or nearly-contiguous composite participant display.

Preferably, the distance between active display portions of adjacent displays is less than or equal to about one inch to approximate the appearance of a contiguous or near-contiguous composite participant display. Aesthetic border portions of the individual participant displays (i.e., inactive areas or "bezels") located between active portions of adjacent individual displays are removed or reduced to minimize the distance between the active portions of the adjacent displays. Each participant display is fixed at a predetermined orientation about a vertical axis such that the plurality of displays forms a gentle arc which is concave (open) toward the conference table 102, such that the arc is similar in shape to an adjacent edge 105 of the conference table and such that the arc has a center of curvature on the longitudinal axis 100 of the telepresence room 102, which center of curvature is located behind the seating positions of the conference participants.

Participant Cameras

Each telepresence conference room has one or more participant cameras 26, 27, 28, 29 (see FIG. 3) located on or close to the top edge of one of the participant displays. Each participant camera may be movably mounted to a linear or arcuate track that permits manual or motorized movement of the camera relative to a lateral (side-to-side) axis of the displays, or each camera may be fixed relative to the lateral axis of the displays. Further, each camera may include manual or motorized pan and tilt, to alter the optical axes of the camera, and manual or motorized zoom, to alter the optical field of vision of the camera (pan, tilt and zoom may be collectively referred to as PTZ).

Alternatively or additionally, each participant camera may be a large-format, high-resolution digital camera which is located in a fixed position relative to the lateral axis of the displays and which has fixed optical axes and a fixed (wide) optical field of vision. As described in further detail below, the images captured by such digital cameras may be digitally cropped as needed to select and optimize the images transmitted to and displayed at the remote conference rooms. Further, the optical field of vision of certain participant cameras may overlap, which provides redundancy for fault tolerance and which provides flexibility in the selection of camera angles.

The optical field of vision of each participant camera is preferably at least about 85 degrees to about 90 degrees in a horizontal direction and at least about 67 degrees in a vertical direction. Preferably there is a participant camera located on or nearly on the longitudinal axis 100 of the telepresence room (i.e., at the center-most position of the composite participant display), which camera has optical field of vision sufficient to capture an image of all participants seated at the conference table.

Conference Table & Seats

Preferably, the conference table 102 is substantially symmetrical about a longitudinal (front-to-back) axis 104 of the table, which lies on, or substantially on, the longitudinal axis 100 of the telepresence room. The facing edge of the table (which faces the participants) is curved or arcuate as viewed from above such that it is convex toward the participants. Specifically, the facing edge 106 has a center of curvature which lies on the longitudinal axis 104 of the table (and the telepresence room) and which lies substantially behind the participant displays.

The conference table 102 has a plurality of predetermined seating locations 108 (and associated chairs) located at predetermined locations disposed along the facing edge of the conference table. Preferably, each seating location 108 is delineated by a pair of visibly distinctive and/or tactile markings 110 on or adjacent the facing edge of the conference table 102.

Preferably, there are an even number of participant seats 108 at the conference table (e.g., 4, 6, 8, 10, etc.), and the seats are arranged symmetrically on either side of the longitudinal axis of the table. Each participant seat is preferably allocated a predetermined and substantially equivalent amount of space (about 30" or about 762 mm), with an additional separation buffer between the two center-most participant seats located on either side of the longitudinal axis of the table (about 6" or about 153 cm). Thus, the minimum lateral dimension (length) of the table is dictated by the number of participant seats at the table. For example, a 4-participant telepresence conference table would have a lateral dimension of greater than or equal to about 126" (4×30"+6", or about 3200 mm).

The table 102 is positioned relative to the participant displays 16, 17, 18, 19 such that a facing edge distance (as defined by the distance between the facing edge of the table and the center-most position of the participant displays, measured along the longitudinal axis of the telepresence room) is sufficient to permit a single participant camera located at the center-most position of the composite participant display and having a horizontal optical field of vision of about 85 degrees to about 90 degrees to capture a complete image of the conference table, including a maximum number of participants seated at the conference table. Preferably, the facing edge distance is not substantially greater than the minimum distance necessary and is at least within 10 or 20 percent of the minimum distance. Thus, for example, for conference tables having maximum seated participants of 4, 6, 8 and 10 persons, the minimum facing edge distance would preferably be about 8 ft (2.5 m), about 10 ft (3 m), about 12.5 ft (3.8 m), and about 17 ft (5.2 m), respectively.

It is preferably that the conference table 102 (and especially the top surface 112 of the table) have a substantially solid, light color (such as maple or another light wood color), without substantial multiple coloring or substantial visible wood grains, and should minimize light and sound reflections.

For telepresence rooms accommodating 12 or more participants (e.g., 12, 16, 18, 20 participants, etc.), the seating is preferably divided in half with the first "row" of seating being located at the first (or primary) conference table 102 and a second row being located in a second tier of seating at a second conference table 116. As with the first conference table, the second conference table has predetermined seating locations and seating markings, and has an arcuate facing edge 106 which is convex (as viewed from above) toward the participants in the second tier. The opposite edge 118 of the second conference table (facing the participants seated at the first conference table) is preferably concave toward the facing edge of the first conference table such that there is a substantially consistent distance between the opposite edge of the second conference table and the facing edge of the first conference table. Preferably, such distance is between about 1 m and about 2 m such that participants seated at the first conference table have sufficient room to access their seats and to maneuver their chairs as desired.

Alternative Presentation Displays

The telepresence room may include an alternative presentation display 120, such as a display for a laptop computer or DVD presentation. Such alternative presentation display 120 is preferably mounted to one of the walls 122 adjacent one of the lateral sides of the conference table 102, or to a support adjacent one of the lateral sides of the conference table. Preferably, the bottom of the alternative presentation display is sufficiently high to permit participants seated at the far end of the conference table to view the entire active portion of the alternative presentation display, anticipating that the conference table will often be populated with other participant's laptops. It has been found that a suitable distance from the floor for the active display portion of alternative presentation displays is about 40" (1 m) off of the floor.

Audio & Acoustics

Preferably, a plurality of cardioid, mini-boundary participant microphones are permanently installed in the top surface of the conference table to capture conversations between the conference participants. The microphones preferably have a small "footprint" of about 1" (radius) and project upward from the top surface of the table a short distance of less than about one-half inch (½"), such that the microphones are inconspicuous. The microphones are located on or near a lateral (side-to-side) center axis of the conference table at substantially equal intervals along the lateral axis such that the distance between any seated participant and the nearest microphone is between about 20" (58.8 cm) and about 30" (76.2 cm). Preferably, the microphones have a sufficient sensitivity and fidelity to capture normal-volume conversations within such range (i.e., about 60 dB sensitivity).

Further, each telepresence room includes a plurality of speakers, preferably located behind the participant displays. Preferably there is a speaker for each individual participant display in the composite participant display, and each speaker is located adjacent one of the individual participant displays, such that there is a one-to-one association of speakers to individual participant displays. As will be discussed in further detail below, the audio and video signals from each remote telepresence room are reproduced/displayed at similar locations to enhance the approximation of an in-person conference.

Preferably, the system includes audio processing electronics to minimize or eliminate undesirable audio effects (such as echoes and feedback) produced in the room, which electronics may be located at each telepresence site and/or at a central location. To minimize such undesirable audio effects, the acoustics of the room should be designed such that the room has a Noise Criteria of less than or equal to about 35. To achieve the desired acoustics, at least one of any two parallel hard surfaces (such as the conference table top and the ceiling, or parallel walls) should be acoustically treated.

Lighting

Preferably, the lighting at each telepresence room is controlled remotely by the telepresence system, such as with wireless (e.g., infra-red) controls, low voltage relay closures, Telnet sessions and/or RS232/422/485, or other suitable means. Preferably, the intensity of the lighting is evenly distributed throughout the portions of the room that are to be captured on video by the cameras, including the participants, the table, the back wall and up to 50% of both side walls. Preferably the intensity of the lighting at the "Face Location" of each participant is about 300-900 Lux using an incident light meter oriented horizontally (i.e., capturing the intensity from light sources above the target) and about 500-900 Lux using an incident light meter oriented vertically (i.e., capturing the intensity from light sources in front of the target).

The term "Face Location" refers to a cube measuring approximately 30" (76 cm) wide×30" (76 cm) high×36" (92 cm) deep centered at each predetermined seat location 6" (15 cm) from the edge and 12" (30 cm) from the surface of the table, which represents the position of a participant's face. Each seat's "Face Location" measurement must fall within the range specified above and the lighting level at each participant's Face Location preferably does not differ more then 10%.

It is preferable that light levels be substantially evenly distributed on the majority of all wall surfaces of the telepresence room that will be captured by the video cameras, such that the lighting levels at any one point on the rear and side walls preferably does not vary no more than about 10%.

To maintain the proper contrast ratio between the participants and the background surface, the lighting intensities on the rear and side walls are preferably about 75% to about 95% of the lowest vertically oriented "Face Location" light intensity measurement using an incident light meter oriented vertically (i.e. capturing the intensity from light sources in front of the target).

The terms rear and side walls refer to the entire wall surface behind, to the left and to the right of the participants, respectively, excluding any location below about 25" (63 cm) above any finished floor. Preferably, only a reading of the light source in front of the wall is necessary, as no objects should protrude from the wall and reflect sources from above.

Preferably, the lighting is substantially evenly distributed on the table top surface, such that any one point on the top surface of the table is preferably within about 10% of the remaining portions of the table top. Preferably, the light intensity on the table top is about 80% to about 100% of the highest horizontal oriented Face Location measurement using an incident light meter oriented horizontally (i.e. capturing the intensity from light sources shining on the table top).

The lighting levels at other locations of the room (besides the Face Location and walls) are preferably substantially evenly distributed throughout the room to prevent dark areas in the video image, and are preferably within about 15% of the Face Location reading. The primary lighting source is preferably a direct/indirect fixture, such as the Ovation™ series by Cooper Lighting, with a recommended bulb temperature of about 3500 Kelvin.

Preferably, during a conference, the telepresence room is free of all external light sources, including sunlight. For telepresence rooms that have windows, there are preferably motorized shades remotely operable by the telepresence system by infra-red (IR), low voltage relay closures, Telnet sessions and/or RS232/422/485, or other suitable means such that the shades may be automatically closed during a conference and re-opened thereafter. Manual controls are also preferably provided.

B. Telepresence Conference Dynamic Scenario Manager

The configuration of telepresence conferences can encompass a very large number of permutations depending on factors such as the number of participating conference rooms, the number of participants in each room and the number of individual participant displays in each room. Preferably, the telepresence system employs a scenario algorithm to dynamically determine the optimal configuration for the telepresence conference for any given set of variable parameters, and which automatically generates and transmits configuration instructions to the various components of the telepresence system to set up and initiate the conference.

Certain characteristics are predetermined and known to the telepresence system, such as the identities of the telepresence rooms within a group of telepresence rooms that may be interconnected via the system, the number of participant cameras and participant displays in each of those rooms, and the presence or absence of any alternative presentation displays.

To configure a telepresence conference, a user (or an operator) enters certain conference-variable data into a terminal connected to the telepresence system, such as the name of the owner/customer of the group of interconnectable telepresence rooms, a list the rooms to be connected in the conference, the number of people in each room, the desired number of video streams to use in the conference, the identity of the room from which an alternate presentation will start (if any), the type of such alternate presentation (e.g., VGA-laptop or DVD-video), the identity of the LVC bridge room (if a Legacy Video Conference-ISDN system is in the conference), the date & time to initiate the conference, and the duration or time to terminate the conference. Preferably, such variable data may be entered via a computer connected to a host computer system via a local area network (LAN) and/or a wide area network (WAN), such as the Internet or a private network.

The scenario algorithm of the telepresence system eliminates the heretofore laborious and costly manual process of predetermining all (or all likely) configuration scenarios, recording such scenarios in a scenario table or list (which may be hundreds or thousands of scenarios), manually referencing the scenario table for an appropriate configuration and manually entering the scenario code into the telepresence system.

Terminology

In the foregoing discussion, the following terms are generally intended to have certain meanings. For example, the term "room" is the physical location where participants are situated and participate in the video conference call, the term "participant display" is a display where images of participants of the conference are displayed, the term "active participant display" is a working (operable) participant display, the term participant camera" is a camera which captures images of conference participants, the term "active participant camera" is a working (operable) participant camera, the term "telepresence room" is a room having the layout and equipment as described herein (including a plurality of individual participant displays) where such equipment may be configured and controlled by the telepresence system, the term "satellite rooms" includes all rooms which share common same equipment at a particular site (however, preferably only one room out of all satellite rooms is active in a conference), the term "site" can encompass multiple rooms and/or satellite rooms, the term "redundancy rack" is used to describe two racks or equipment (one primary, and the other secondary).

To initiate a telepresence conference, the user or operator first enters certain parameters into the system, including:

1. The customer name;
2. A list all the customer rooms to be connected;
3. The number of people in each room;
4. The identify of a room from which the alternate presentation will start (if any) and the type of alternate presentation (e.g., VGA (Laptop) and/or DVD Video); and
5. The identity of the LVC (ISDN) bridge room, if an LVC system is to be connected to the conference. (TelDsm-VNOC1.0-R.1)
6. The date & time to initiate the conference, and the duration or time to terminate the conference.

Based upon this variable input and the known (predetermined) parameters of each telepresence room, the scenario algorithm will determine if the desired conference configuration is feasible. If the desired conference configuration is not feasible, the system preferably displays an appropriate error message to the user.

To ascertain whether a conference may be configured according to the user input, the scenario algorithm determines whether the following required conditions are met for each desired room, where an LVC (if any) is counted as one room.

Active Participant Cameras

A first necessary condition for establishing a desired conference is that each telepresence room (i.e., non-LVC room) in the conference must have a sufficient number of active (i.e., operable) participant cameras to capture a unique image for each other room in the conference (including any LVC room). This ensures that each remote room in the conference (including any LVC room) can be sent a unique viewing angle. Thus, the number (E) of active participant cameras in each telepresence room must be greater than or equal to the number of rooms in the conference (R) minus one, where any LVC is counted as one room. [$E >= R-1$].

This requirement may also be represented by the condition that the number of rooms (R) in the conference (including any LVC) must be less than or equal to the number or active participant cameras (E) in such telepresence room plus one. [$R <= E+1$].

If the above condition is not met for any room in the conference, the system preferably terminates the scenario algorithm and generates an error message, such as "Cannot set up the call because of insufficient equipment in Room {Name}," where {Name} is replaced by a predetermined name for the room which does not meet the requirements.

It can be appreciated that the above requirement is not necessary for LVC rooms in a conference because such rooms have only one camera and thus transmit the same image to all other rooms in a conference.

Active Participant Displays

A second necessary condition for establishing a desired conference is that each telepresence room (i.e., non-LVC room) in the conference must have a sufficient number of active participant displays to display at least one incoming video stream from all of the other rooms in the conference. Ordinarily, for each telepresence room, each active participant display will display only one incoming video stream. However, image combiners may be employed in telepresence rooms to display (combine) two or more separate incoming video streams on one display. Usually each such image combiner will be dedicated (connected) to only one participant display and will combine a maximum of two incoming video streams. However, such image combiners may combine more than two video streams.

If no active participant display in a telepresence room (i.e., non-LCV room) is connected to an image combiner, then for such each telepresence room in the conference the number of rooms (R) in the conference (including any LVC) must be less than or equal to the total number of active participant displays in the room ($D_T$) plus one. [$R <= D_T+1$].

This requirement may also be represented by the condition that the total number of active participant displays in each telepresence room in the conference ($D_T$) must be greater than or equal to the number of total rooms in the conference (R) minus one, where an LVC (if any) is counted as one room. [$D_T >= R-1$].

If any number (N) of active participant displays in a telepresence room is connected to a dedicated image combiner (an image-combined display), and each image combiner can combine an equal, predetermined number of video streams (X), then the total number ($X_T$) of incoming video streams that the image-combined displays in the room can display is equal to the number (N) of image-combined displays multiplied by the predetermined number of video streams (X), that is $X_T=N*X$. For each such room, the total number of rooms in the conference (R) must be less than or equal to the total number of active participant displays in the room ($D_T$) plus one, less the number of image-combined displays in the room (N), and plus the total number ($X_T$) of video streams that the image-combined displays can display, where any LVC is counted as one room. [$R <= D+1-N+X_T$, where $X_T=N*X$]

This requirement may also be represented by the condition that, for each such room, the total number of active participant displays ($D_T$) must be greater than or equal to the number of rooms in the conference (R) minus one (where any LVC is counted as one room), plus the number (N) of image-combined displays, and less the total number ($X_T$) of video streams that the image-combined displays can display. [$D_T >= R-1+N-X_T$, where $X_T=N*X$].

If, as above, any number (N) of active participant displays in a telepresence room is connected to dedicated image combiner(s), but every image combiner is not operable to combine the same predetermined number of video streams ($X_i$), then the total number ($X_T$) of incoming video streams that the image-combined displays ($D_{1-N}$) in the room can display is equal to the sum of the predetermined numbers ($X_i$) of video streams for all such image-combined displays (i.e., $X_T = \Sigma (X_i)$, where i=1 to N). For each such room, the number of rooms (R) in the conference (including any LVC) must be less than or equal to the total number of active participant displays in the room ($D_T$) plus one, minus the number (N) of image-combined displays in the room, plus the total number ($X_T$) of video streams that the image-combined displays can display, where any LVC is counted as one room. [$R \leq D+1-N+X_T$, where $X_T = \Sigma (X_i)$, and i=1 to N].

This requirement may also be represented by the condition that, for each such telepresence room, the total number of active participant displays in the room ($D_T$) must be greater than or equal to the number of rooms in the conference (R) minus one (where any LVC is counted as one room), plus the number of image-combined displays in the room (N), and less the total number ($X_T$) of video streams that the image-combined displays can display. [$D \geq R-1+N-X_T$, where $X_T = \Sigma (X_i)$, and i=1 to N].

The algorithm employs one or more of the above equations (or mathematical equivalents thereof) to check whether each room in the conference meets this second condition. If the condition is not met for any room in the conference, the system preferably terminates the scenario algorithm and generates an error message.

It can be appreciated that the above requirement is not necessary for LVC rooms in a conference because such rooms display all participants on one display, in an array of boxes.

Active Alternative Presentation Displays

A third necessary condition is required when an alternative presentation or a lectern presentation is desired in the conference.

When such an alternative (or lectern) presentation is desired, one telepresence room is designated as the initiating room, meaning that the alternative (or lectern) presentation will be generated (at least initially) from the initiating room.

A necessary requirement for such a conference is that each non-initiating, telepresence room (i.e., non-initiating, non-LVC room) must have an active alternative presentation display.

Each LVC may not require a separate alternative presentation display since, with some systems, such an alternative presentation will be displayed in one of the "boxes" of the standard array of boxes in a single LVC display (i.e., a "Hollywood Square" format).

If any of the above three conditions are not met for any telepresence room in the conference, the system preferably terminates the scenario algorithm and generates an error message, such as "Cannot set up the call because of insufficient equipment in Room {Name}," where {Name} is replaced by a predetermined name of the room which does not meet the requirements. Conversely, if all of the above conditions are met, then the desired conference configuration is feasible and the system moves to the next steps to configure the conference.

Video Stream Routing

In configuring the telepresence conference, the system preferably determines the optimal routing of video streams among the rooms in the conference. A minimal requirement is that each telepresence room in the conference must send at least one unique, outgoing participant video stream to every other room in the conference (including any LVC room). The corollary requirement is that each room in the conference (including any LVC) must receive at least one unique, incoming participant video stream from every other telepresence in the room in the conference. However, often, after accounting for such unique video streams, there remain unused participant displays and participant cameras in some of the telepresence rooms. The system preferably configures the conference to employ such unused equipment in an optimal manner, as desired by the user.

Telepresence Room Priority

As an initial step in determining the optimal routing of audio/video streams among the rooms in a conference, the system preferably assigns a relative priority for each telepresence room. The relative priority of telepresence rooms is primarily assigned according to the number of active (working) participant displays in the telepresence rooms and secondarily according to the number of participants in the telepresence rooms. (TelDsm-VNOC1.0-R.5)

The telepresence room that has the most active participant displays is assigned the highest priority, and, if two telepresence rooms in the conference have the same number of active participant displays, the telepresence room with a higher number of participants will be given the higher priority of the two rooms. If two telepresence rooms have the same number of active participant displays and the same number of participants, a desired room priority designation entered by the user may be used to assign priority to the rooms, or the system may assign one of the rooms the higher priority by any suitable predetermined or random means. (Rule 1). Any LVC room is giving the lowest (or no) priority.

For example, in Table A below, priority will be assigned as follows (from highest priority to lowest): Room 1, Room 2, Room 4, and Room 3. The LVC room is given the lowest (or no) priority.

TABLE A

| Room Name | Working Displays | Participants | Priority | Virtual Position |
|---|---|---|---|---|
| Telepresence Room 1 | 5 | 4 | 1 | 1 |
| Telepresence Room 2 | 4 | 8 | 2 | 2 |
| Telepresence Room 3 | 3 | 4 | 4 | 4 |
| Telepresence Room 4 | 4 | 8 | 3 | 3 |
| LVC | 1 | X | X | X |

The priority of each telepresence room may be considered as a position a virtual conference circle (Rule 2), with the highest priority telepresence room located at a first position (e.g., 6 o'clock), the second-highest priority telepresence room located at a second position (e.g., 9 o'clock), and so-on around the virtual circle (e.g., in a clockwise rotation). In the above example, Room 1 could be considered to be in the first position (6 o'clock), Room 2 in the second position (9 o'clock), Room 4 in a third position (12 o'clock), and Room 3 in a fourth position 4 (3 o'clock).

After determining the relative priorities of the telepresence rooms in the conference, the system determines participant video stream connections between the telepresence rooms in the conference.

First, the system determines whether the highest-priority telepresence room may send/receive more than one participant video stream to/from the second-highest priority telepresence room. (TelDsm-VNOC1.0-R.8). The number of outgoing participant video streams that can be sent from any telepresence room is equal to the number of working participant cameras (E) in the room. Likewise, the number of incoming participant video streams that can be received by any telepresence room is equal to the number of working participant displays (D). Further, for each telepresence room, at least one unique, outbound video stream must be assigned to every other room in the conference (including any LVC room), and each room in the conference must receive at least one unique, inbound participant video stream from every other telepresence room.

Thus, the highest-priority telepresence room may send/receive more than one participant video stream to/from the second-highest telepresence room if the number of active participant cameras (E) and active participant displays (D) in the highest-priority telepresence room are both greater than then number of rooms (R) in the conference minus one (1) (including any LVC room).

If both E and D are equal to R−1, then the highest-priority telepresence room may only send/receive one participant video stream to/from the second-highest priority telepresence room. In this event, every telepresence room may only send/receive one participant video stream to/from the other telepresence rooms, since (by order of priority) all lower-priority telepresence rooms must have an equal or lesser number of participant displays. Thus, in this event, the system assigns the one participant video stream from each telepresence room to every other telepresence room. At this point, all of the participant video stream determinations are complete.

If, for the highest-priority telepresence room, both E and D are greater than R−1, then the highest-priority telepresence room may possibly send/receive more than one participant video stream to/from the second-highest priority telepresence room, provided there are sufficient participant cameras and participant displays in the second-highest priority telepresene room. (Rule 1). Further, it may be possible to send/receive more than one participant video stream among the lower-priority telepresence rooms. To determine the optimal routing of participant video streams in this event, the system performs an iterative participant video stream routing procedure.

In the first iteration, the system computes a quotient (Q) as the number of available (unassigned) participant displays (none are yet assigned in the first iteration) in the source telepresence room (currently the highest-priority room) divided by the number of unassigned lower-priority rooms in the conference (none are yet assigned in the first iteration). In the first iteration, the unassigned lower-priority rooms includes the second-highest priority telepresence room and all lower-priority telepresence rooms (including any LVC). If the quotient Q is greater than or equal to number of maximum desired streams per room (N) previously entered by the user, then only the central displays of highest priority telepresence room are used. (TelDsm-VNOC1.0-R.9, Rule 1)

If the quotient Q is equal to 1 and the remainder is non-zero, the target room (currently the second-highest priority room) is assigned two outgoing video streams from the source telepresence room (left and right sides of the table of the source telepresence room), provided the target telepresence room has a second participant display available for use, after accounting for one participant display for all rooms in the conference (including the highest priority telepresence room and any LVC room). (Rule 2).

If the quotient Q is greater than 1, the target priority room can be sent N participant video streams if N is equal to Q, or Q streams, if other conditions are met. (Rule 3).

If the quotient Q is equal to 1 and the remainder is zero, only one outgoing participant video stream is assigned from the source telepresence room to the target telepresence room. (Rule 4).

In any event, before assigning (N) outgoing participant video streams, the system confirms that the target telepresence room has at least one participant display/camera pair for each room in the call. If this condition is not met, only one participant video stream is assigned from the source telepresence room to the target telepresence room. (Rule 5).

After assigning the outgoing participant video steams from the source telepresence room to the target telepresence room, a reciprocal configuration is used to assign the outgoing participant video streams from the target telepresence room to the source telepresence room. (Rule 7).

Any LVC in the conference is assigned only one participant display and one participant camera in each telepresence room. (Rule 6).

At this point the system has completed the determination of the quantity of participant video streams between the highest-priority (source) telepresence room and the second-highest (target) priority telepresence room and stores the results.

If there are no other telepresence rooms in the conference (i.e., only two telepresence rooms), then the system exits the iterative participant video stream routing process and proceeds to configure any alternative presentations, if any, as specified in Rule 9 below.

If there is a third telepresence room in the conference, the system performs another iteration of the participant video stream routing process to determine the quantity of participant video stream(s) between the highest-priority telepresence room (as the source) and the third-highest priority telepresence room (as the target).

For this iteration, the number of available (unassigned) participant displays in the source telepresence room is reduced by the determination(s) made in the first iteration, and the number of unassigned lower priority telepresence rooms is reduced by one, since the quantity of participant video streams between the highest- and second-highest priority telepresence rooms has already been determined. The system then re-computes a quotient (Q) using the number of available (unassigned) participant displays in the source telepresence room divided by the number of unassigned lower-priority rooms in the conference (including any LVC room).

The participant video stream assignment(s) between the source telepresence room (currently the highest-priority) and the target telepresence room (currently the third-highest) are assigned according the participant video stream routing rules set forth above, including the reciprocal configuration from the target telepresence room to the source telepresence room. (Rule 7).

At this point the system has completed the determination of the quantity of video streams between the highest priority telepresence room and second-highest telepresence room, and between the highest priority telepresence room and third-highest telepresence room. If there is a fourth telepresence room in the room in the conference, the system performs yet another iteration of the video stream routing procedure, as above, where the highest-priority telepresence room is again considered the source telepresence room and the fourth-highest telepresence room is considered the target telepresence room.

The system performs as many iterations of the video stream routing process as is necessary to determine the quantity of participant video streams between the highest-priority telepresence room and all of the lower-priority telepresence rooms. Once all such assignments are made for the highest-priority telepresence room, the system performs subsequent, similar sets of iterations of the participant video stream routing process wherein each lower-priority telepresence room is considered, in turn, as the source telepresence room (and the lesser-priority telepresence rooms are each considered, in turn, as the target), until participant video stream quantity determinations have been made among all of the telepresence rooms and any LVC room.

The total number of iterations of the video stream routing process necessary for conferences having 2, 3 and 4 telepresence rooms is set forth in Table B below, along with the respective priorities of the source and target rooms and the number of unassigned lower-priority rooms, for each iteration.

TABLE B

| Telepresence Rooms | Interation Number | Source Room Priority | Target Room Priority | Number of Unassigned Lower-Priority Rooms |
|---|---|---|---|---|
| 2 | 1 | $1^{st}$ highest | $2^{nd}$ highest | 1 |
| 3 | 1 | $1^{st}$ highest | $2^{nd}$ highest | 2 |
|   | 2 | $1^{st}$ highest | $3^{rd}$ highest | 1 |
|   | 3 | $2^{nd}$ highest | $3^{rd}$ highest | 1 |
| 4 | 1 | $1^{st}$ highest | $2^{nd}$ highest | 3 |
|   | 2 | $1^{st}$ highest | $3^{rd}$ highest | 2 |
|   | 3 | $1^{st}$ highest | $4^{th}$ highest | 1 |
|   | 4 | $2^{nd}$ highest | $3^{rd}$ highest | 2 |
|   | 5 | $2^{nd}$ highest | $4^{th}$ highest | 1 |
|   | 6 | $3^{rd}$ highest | $4^{th}$ highest | 1 |

After (or before) configuring the video streams between all of the telepresence rooms in the conference, the system preferably also configures any alternative presentation by assigning the presentation display in each non-initiating telepresence room to display the alternative presentation from the initiating telepresence room and to send the alternative presentation to any LVC room. (Rule 9).

Participant Camera/Display Pair Assignments

Preferably during (or optionally after) the determination of the quantities of participant video streams to be sent among the rooms in the conference, the system also determines and assigns the particular equipment (e.g., displays, cameras and speakers and associated codecs) to be connected between the various rooms.

Preferably, each telepresence room includes pairs of participant displays/cameras, where each pair is assigned a predetermined position number, starting with a first position (e.g., position zero on the left) and increasing by one position moving to the opposite side (e.g., left to right). To achieve realistic (virtual) eye contact among all the participants of the conference, the system preferably connects the participant displays and cameras of each pair to the same remote room. These predetermined position numbers may be used to assign connections between the various equipment.

Generally, the participant display/camera pairs in the highest priority telepresence room are assigned to the other rooms in the conference beginning from one side (e.g, from left-to-right), in order of the priority of the other rooms in the conference. Thus, generally, the left-most participant display/camera pairs(s) in the highest priority room will be assigned to the telepresence room with the second-highest priority, and so on, in accordance with the video stream quantity determinations described above.

To further enhance the virtual eye contact among the participants of the conference, the system preferably connects the left-most active participant display/camera pair(s) (and associated codecs) in a given telepresence room to the right-most active participant display/camera pair(s) (and associated codecs) in the next lower-priority telepresence room. (TelDsm-VNOC1.0-R.3). Further, the left-most active participant display/camera pair(s) (and associated codecs) in the lowest-priority telepresence room are preferably connected to the right-most active participant display/camera pair(s) (and associated codecs) in the highest-priority telepresence room.

Subsequent assignment of unassigned participant display/camera pairs in each telepresence room is preferably performed from left to right in order of priority of the lower-priority rooms.

The assignment of the participant display/camera pair for the LVC (if any) is preferably made after the assignments among the telepresence rooms in the conference.

If such assignments (for example the assignment between the lowest-priority telepresence room and the highest-priority telepresence room) would result in an unassigned participant display/camera pair between two assigned participant display/camera pairs, the system preferably alters (e.g., shifts) the assignments such that there exists no unassigned participant display/camera pairs between two assigned pairs.

Alternatively, the center-most two participant displays/cameras in a telepresence room are preferably used where the long axis of the table in the telepresence room is aligned with the longitudinal axis of the telepresence room. (TelDsm-VNOC1.0-R.4)

Figure 3:
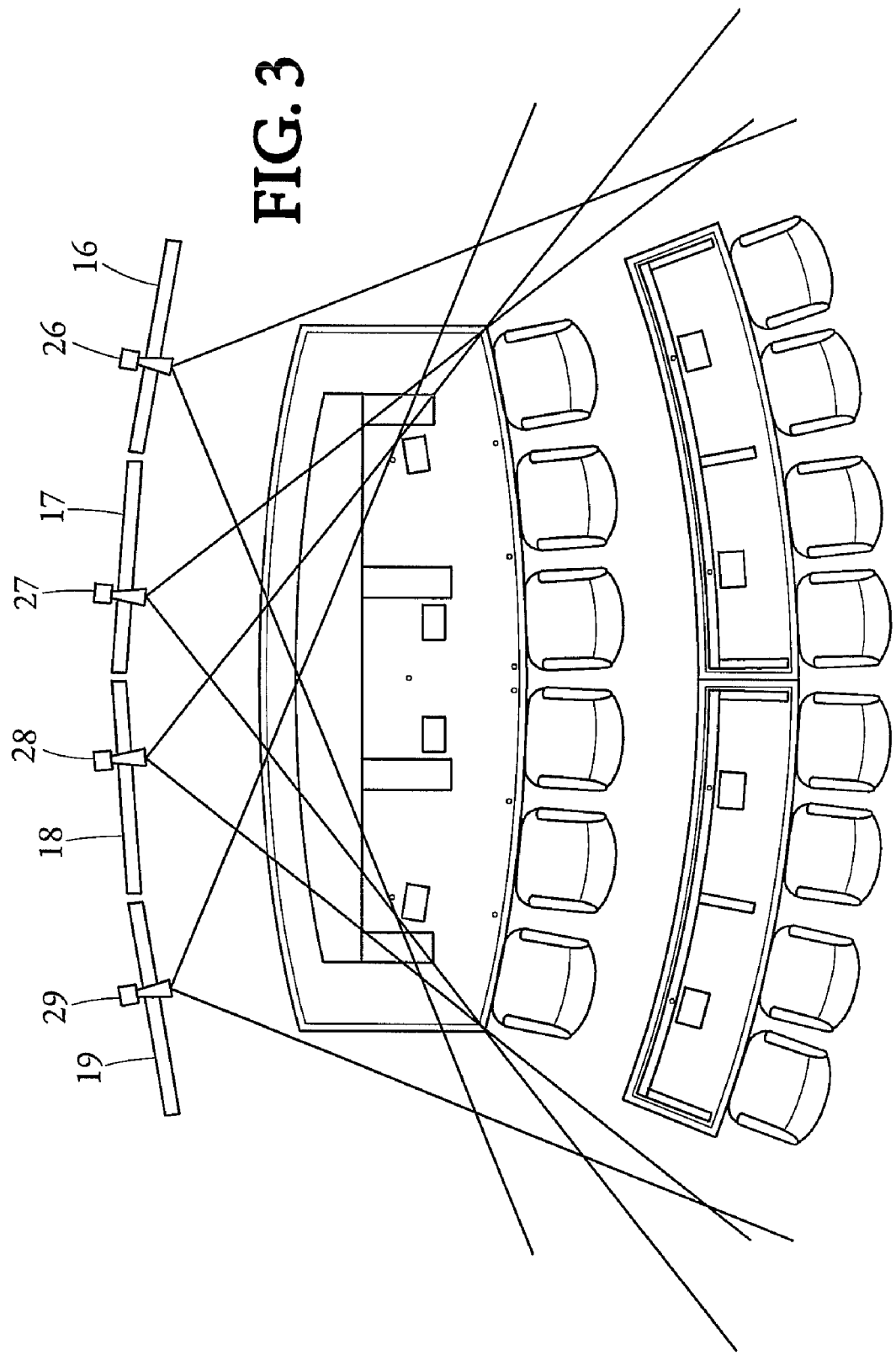
Figure 4:
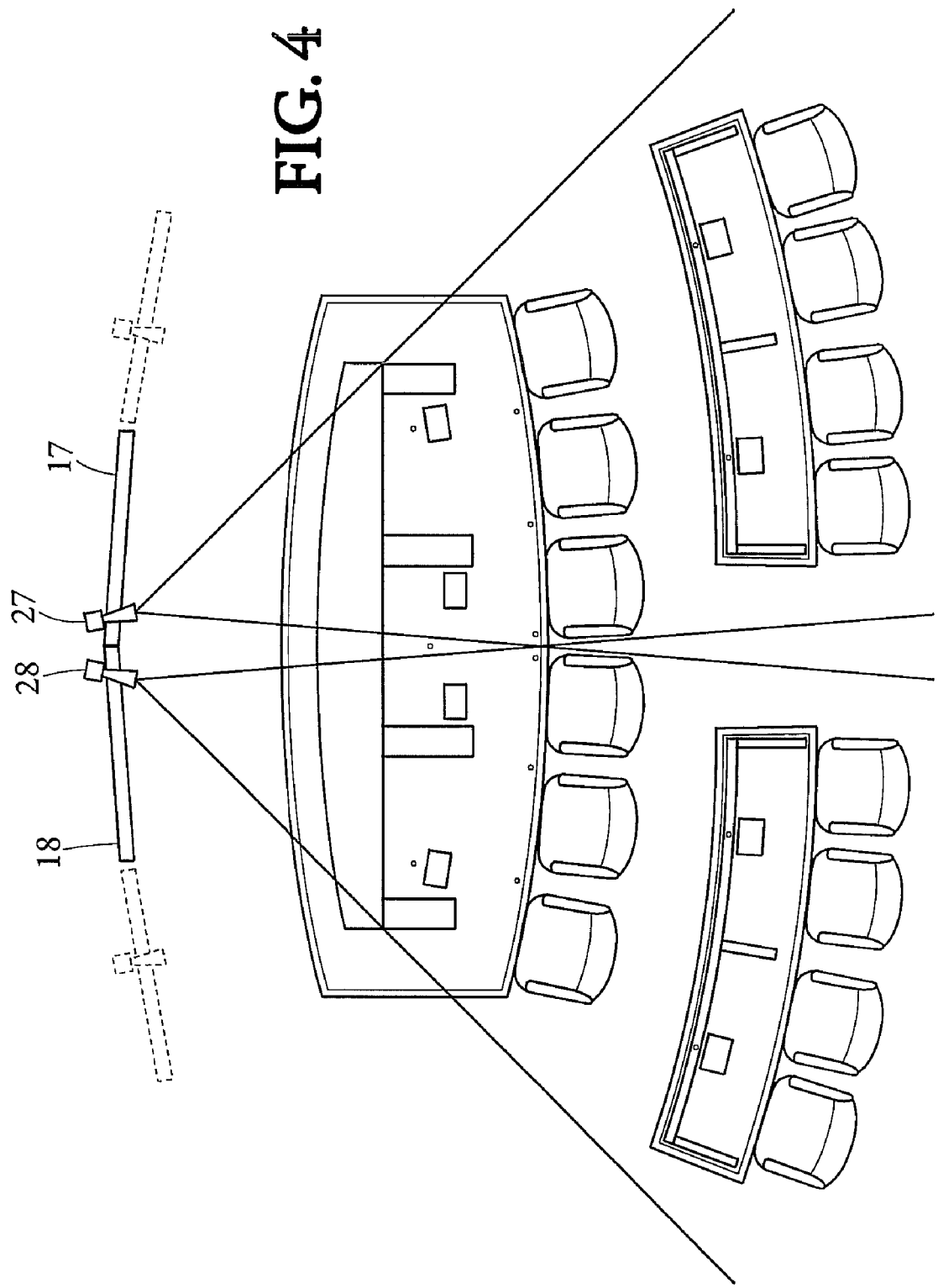
Figure 5:
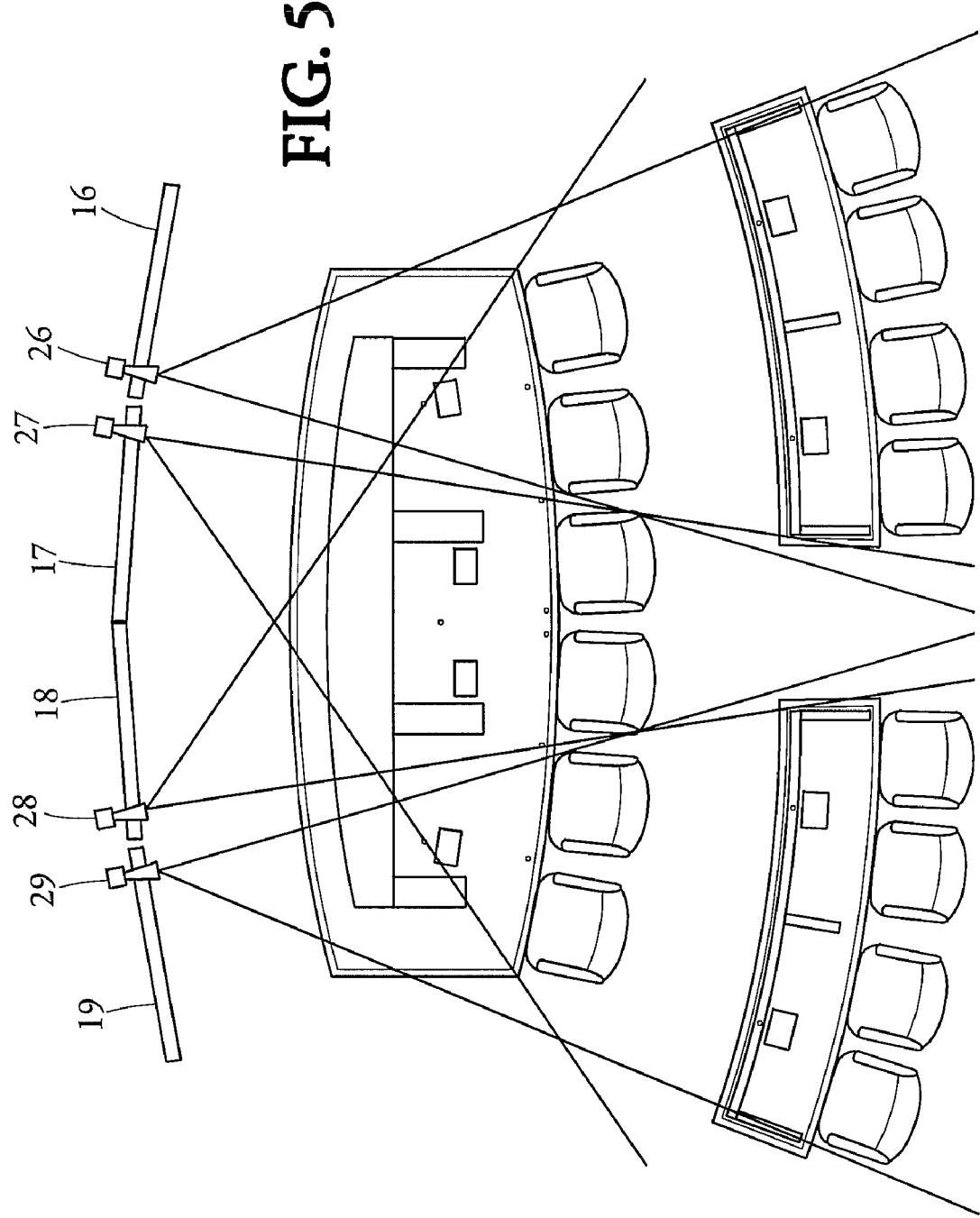

Referring to FIGS. 3-5, the participant cameras 26, 27, 28, 29 preferably have three predetermined positions; A, B and C positions being the left-most position, the center position, and the right-most position, respectively, on the associated participant displays 16, 17, 18, 19.

As depicted in FIG. 3, where there are multiple remote rooms in the conference (e.g., 4) such that each participant display 16, 17, 18, 19 is assigned to one of the remote rooms, each participant camera 26, 27, 28, 29 is preferably located in the B (center) position, and each participant camera is configured to capture the entire teleconference room.

As depicted in FIG. 4, where there is one remote room in the conference and two participant displays are assigned to the one remote room, preferably the center-most participant displays 17, 18 are used and the participant cameras 27, 28 associated therewith are located in the A and C positions, respectively, such that the participant cameras are adjacent the center of the composite display. The participant cameras 27, 28 are each configured to capture approximately one-half of the conference table, with an area of overlap.

As depicted in FIG. 5, where there are two remote rooms in the conference and a pair of two adjacent participant displays 16-17 and 18-19 are assigned to each room, the pair of participant cameras associated with each pair 26-27 and 28-29 are preferably located in the A and C positions, such that the pair of participant cameras are adjacent one another. Preferably each one of the pair of participants is configured to capture approximately one-half of the conference table, with an area of overlap.

To yet further enhance the simulation of an in-person conference, each participant speaker (not shown) associated with each display/camera pair is preferably located adjacent the associated display/camera pair. The assignments made above simultaneously assign the each participant speaker to the remote room assigned to the associated (adjacent) display/camera pair, via the associated Audio/Video codec. Thus, conversation and other audio generated at a remote room will be reproduced in the local room adjacent the assigned display/camera pair.

Configuration Script Generation and Transmission

After completing the participant video stream computations and participant display/camera pair assignments set forth above, the system preferably generates scripts to configure codec teleconference activation and deactivation connector application/systems at each of the telepresence room sites to effectuate the assignments. Preferably such configuration scripts are in a format suitable to be received and executed by application/systems and is transmitted to the application/systems the network (such as the XML format). (TelDsm-VNOC1.0-R.10). Such a configuration script for participant video stream assignments (streams.xml) may be in the following form:

```
----------------------------Start Streams.xml----------------------------
<?xml version="1.0" encoding="UTF-8"?>
<Message xmlns:xsi="http://www.w3.org/2001/XMLSchema-instance">
    <Stream>
        <Encoder>
            <IPAddress>1.2.2.3</IPAddress>
            <EncoderName>london0</EncoderName>
            <SlotId>1</SlotId>
            <PortId>0</PortId>
            <CopyNum>0</copyNum>
            <UDPPort>4443</UDPPort>
        </Encoder>
        <Decoder>
            <IPAddress>1.2.2.3</IPAddress>
            <DecoderName>India1</DecoderName>
            <SlotId>1</SlotId>
            <PortId>0</PortId>
            <CopyNum>0</copyNum>
            <UDPPort>5000</UDPPort>
        </Decoder>
    </Stream>
    <Stream>
        <Encoder>
            <IPAddress>1.2.2.4</IPAddress>
            <EncoderName>london1 </EncoderName>
            <SlotId>1</SlotId>
            <PortId>0</PortId>
            <CopyNum>0</copyNum>
            <UDPPort>4443</UDPPort>
        </Encoder>
        <Decoder>
            <IPAddress>1.2.2.3</IPAddress>
            <DecoderName>India0 </DecoderName>
            <SlotId>1</SlotId>
            <PortId>0</PortId>
            <CopyNum>0</copyNum>
            <UDPPort>5000</UDPPort>
        </Decoder>
    </Stream>
    <Stream>
        <Encoder>
            <IPAddress>1.2.2.6</IPAddress>
            <EncoderName>london2 </EncoderName>
            <SlotId>1</SlotId>
            <PortId>0</PortId>
            <CopyNum>0</copyNum>
            <UDPPort>4443</UDPPort>
        </Encoder>
        <Decoder>
            <IPAddress>1.2.2.8</IPAddress>
            <DecoderName>India2 </DecoderName>
            <SlotId>1</SlotId>
            <PortId>0</PortId>
            <CopyNum>0</copyNum>
            <UDPPort>5000</UDPPort>
        </Decoder>
    </Stream>
</Message>
----------------------End Streams.xml----------------------
```

If a laptop alternate presentation is in the conference, the system preferably generates and transmits a laptop alternate presentation configuration script, which may, for example, transmitted to Lara echo presentation connector applications. (TelDsm-VNOC1.0-R.11) Such a laptop alternate presentation configuration script (presentation.xml) may be in the following form:

```
-------------Start Presentaion.XML-------------------------
<? xml version="1.0" encoding="UTF-8"?>
<Display xmlns:xsi="http://www.w3.org/2001/XMLSchema-instance">
    <VGA>
        <SourceIPAddress>12.23.345.4 </SourceIPAddress>
        <DestinationIPAddress> 12.34.45.6</DestinationIPAddress>
        <DestinationIPAddress> 12.34.45.7</DestinationIPAddress>
        <DestinationIPAddress> 12.34.45.8</DestinationIPAddress>
    </VGA>
</Display>
---------------------End Presenatation.xml------------------
```

If a DVD alternate presentation is in the conference, the system preferably generates and transmits a DVD alternate presentation configuration script. Such a DVD alternate presentation configuration script may be in the following form:

```
-----------Start DVDPresentation.xml----------------------
<?xml version="1.0" encoding="UTF-8"?>
<Dvd>
    <Stream>
        <Encoder>
            <IPAddress>1.2.2.3</IPAddress>
            <EncoderName>london0</EncoderName>
            <SlotId>1</SlotId>
            <PortId>0</PortId>
            <UDPPort>4443</UDPPort>
        </Encoder>
        <Decoder>
            <IPAddress>1.2.2.5</IPAddress>
            <DecoderName>India1</DecoderName>
            <SlotId>1</SlotId>
            <PortId>0</PortId>
            <UDPPort>5005</UDPPort>
        </Decoder>
        <Decoder>
            <IPAddress>1.2.2.8</IPAddress>
            <DecoderName>Singapore1 </DecoderName>
            <SlotId>1</SlotId>
            <PortId>0</PortId>
            <UDPPort>5000</UDPPort>
        </Decoder>
        <Decoder>
            <IPAddress>1.2.2.10</IPAddress>
            <DecoderName>boston </DecoderName>
            <SlotId>1</SlotId>
            <PortId>0</PortId>
            <UDPPort>5000</UDPPort>
        </Decoder>
    </Stream>
</Dvd>
----------End DVDPresentation.xml-----------------------
```

Preferably, each assignment is recorded in a log file for debugging. (TelDsm-VNOC1.0-R.13)

If lectern alternate presentation is in the conference, the system preferably generates a lectern alternate presentation script, as set forth below. The room that is selected as the source will have a stream connected from the source encoder to each destination decoder, and each destination encoder will connect to the source decoder. The encoder and decoder that can be used will have active status as 'L'.

```
----------------Example Lectern XML----------------------------------
<?xml version="1.0" encoding="UTF-8"?>
<Lectern>
    <Stream>
        <Encoder>
            <IPAddress>10.254.230.13</IPAddress>
            <Name>CameraFour</Name>
            <SlotId>1</SlotId>
            <PortId>5</PortId>
            <UDPPort>5040</UDPPort>
        </Encoder>
        <Decoder>
            <IPAddress>10.254.230.45</IPAddress>
            <Name>DisFour</Name>
            <SlotId>1</SlotId>
            <PortId>5</PortId>
            <UDPPort>5040</UDPPort>
        </Decoder>
    </Stream>
    <Stream>
        <Decoder>
            <IPAddress>10.254.230.13</IPAddress>
            <Name>CameraFour</Name>
            <SlotId>1</SlotId>
            <PortId>5</PortId>
            <UDPPort>5040</UDPPort>
        </Decoder>
        <Encoder>
            <IPAddress>10.254.230.45</IPAddress>
            <Name>DisFour</Name>
            <SlotId>1</SlotId>
            <PortId>5</PortId>
            <UDPPort>5040</UDPPort>
        </Encoder>
    </Stream>
</Lectern>
----------------------------------end of Lectern XML------------------
```

Example Telepresence Conference Configuration

Figure 6:
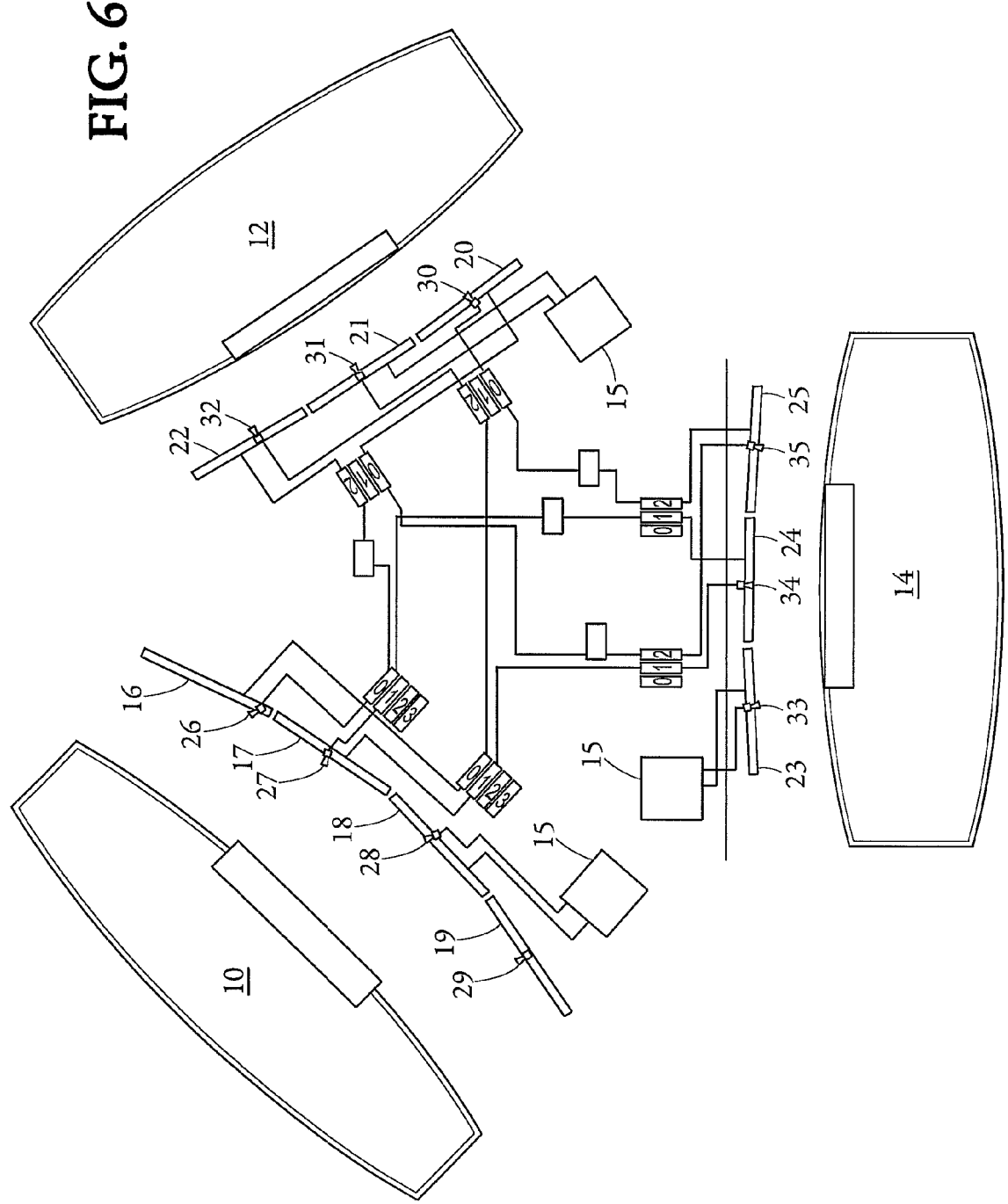
FIG. 6 is a schematic of a telepresence conference configured in accordance with the invention.

Referring to FIG. 6, the system would configure the depicted conference having three telepresence rooms 10, 12 and 14, one LVC room 16, and no alternative presentation as follows. First, the system would confirm whether the desired conference is feasible. Since each telepresence room 10, 12, 14 has a sufficient number of participant displays 16-25, and participant cameras 26-36, the system would determine that the desired conference is feasible. Specifically, room 10 has four participant display/camera pairs (16/26, 17/27, 18/28 and 19/29), and rooms 12 and 14 each have three participant display/camera pairs (20/30, 21/31, 22/32 and 23/33, 24/34, 25/35, respectively) and there is no alternative presentation in the conference. Thus, the desired conference configuration satisfies the feasibility rules set forth above.

Next, the system would assign relative priorities between the telepresence rooms 10, 12 and 14, with telepresence room 10 being the highest priority (having the highest number of participant displays, four), room 12 being the second-highest priority telepresence room, and room 14 being the third-highest priority telepresence room (assuming room 12 has a higher number of participants).

Next, the system would proceed to determine the optimal video stream routing between the highest-priority telepresence room 10 and the other telepresence rooms in the conference. Starting with the highest-priority telepresence room 10, the system determines the quotient Q as being 1.5 (four active participant displays, divided by four rooms in the conferences less one).

Assuming the desired number of streams (N) entered by the user/operator is the default value of two, the first video stream rule that applies is Rule 2 (Q=1 and remainder is non-zero). However, both the second-highest and third-highest priority telepresence rooms 12 and 14 each have only three active participant displays, and there are four rooms in the conference (including the LVC), which means that neither lower-priority telepresence room has an excess of participant displays or participant cameras available to receive more than one stream from the highest-priority telepresence room.

Therefore, one video stream is assigned from the highest priority telepresence 10 room to the second-highest priority telepresence room 12, and one video stream is assigned from the highest priority telepresence 10 room to the third-highest priority telepresence room 14. Likewise, one video stream is assigned from the second-highest priority telepresence room 12 to the highest-priority telepresence room 10, and one video stream is assigned from the third-highest priority telepresence room 14 to the highest-priority telepresence room 10.

Preferably, the system assigns the left-most participant display/camera pair 16/26 and of the highest-priority telepresence room 10 to the right-most participant display/camera pair 22/32 of the second-highest priority telepresence room.

Since there are three telepresence rooms in the conference, the system performs a second iteration of the stream computation process to configure the video stream routing between the second-highest priority telepresence room 12 and the third-highest telepresence room 14. Specifically, the system recalculates the quotient Q as the number of available (unassigned) participant displays of the second-highest telepresence room 12 (which currently number two), divided by the number of lower-priority rooms in the conference (which currently number two), resulting in a Q value of one. Thus, the first video stream rule that applies is Rule 1 (Q=1 and remainder is zero).

Therefore, only one video stream is assigned from the second-priority telepresence 12 room to the third-highest priority telepresence room 14. Likewise, only one video stream is assigned from the third-highest priority telepresence room 14 to the second-priority telepresence room 12.

Preferably, the system assigns the left-most participant display/camera pair 20/30 of the second-priority telepresence room 12 to the right-most participant display/camera pair 25/35 of the third-highest priority telepresence room 14.

In this example, the system has assigned the LVC to the left-most participant display/camera pair 23/33 of the third-highest (i.e., lowest) priority telepresence room 14. Therefore, the next left-most (available) participant display/camera pair 17/27 is assigned to the next right-most (available) participant display/camera pair 24/34 of the third-highest priority telepresence room 14.

The remaining participant display/camera pair 21/31 in the second-highest priority telepresence room 12, and the next-contiguous (available) participant display/camera pair 18/28 in the highest priority telepresence room 10 are assigned to the LVC room 15.

There being no more rooms and no alternative presentation in the conference, the system has, as this point, completed the determination of and equipment assignment for all of the video streams between the telepresence rooms 10, 12 and 14 and the LVC room.

Upon completion of the assignments of the video streams between all rooms in the conference, the system proceeds to generate the configuration scripts in accordance with the scripts described above.

Assuming the user/operator has indicated that the conference is to be initiated immediately, the configurations scripts are converted into protocol commands that can be understood by the equipment in each telepresence room and/or LVC room or operator and then transmitted to initiate the conference.

At the request of the user/operator, or at a predetermined time (or duration) the system preferably terminates the conference by transmitting suitable termination instructions to each telepresence room and/or LVC room or operator.

If the user/operator has indicated that the conference is to be initiated at a predetermined future time, the configuration scripts are preferably stored and transmitted to the telepresence rooms and/or LVC room or operator at the predetermined time to initiate the conference. As above, at the request of the user/operator, or at a predetermined time (or duration) the system preferably terminates the conference by transmitting suitable termination instructions to each telepresence room and/or LVC room or operator.

If the telepresence room includes digital high-definition (HD) participant displays and/or digital participant cameras receiving/sending digital video signals (e.g., HDSDI), the telepresence room includes a digital layer for such signals, the heart of which is a remotely-configurable 16×16 digital video matrix switch (not shown).

C. Telepresence Conference Diagnostics and Control

Figure 7:
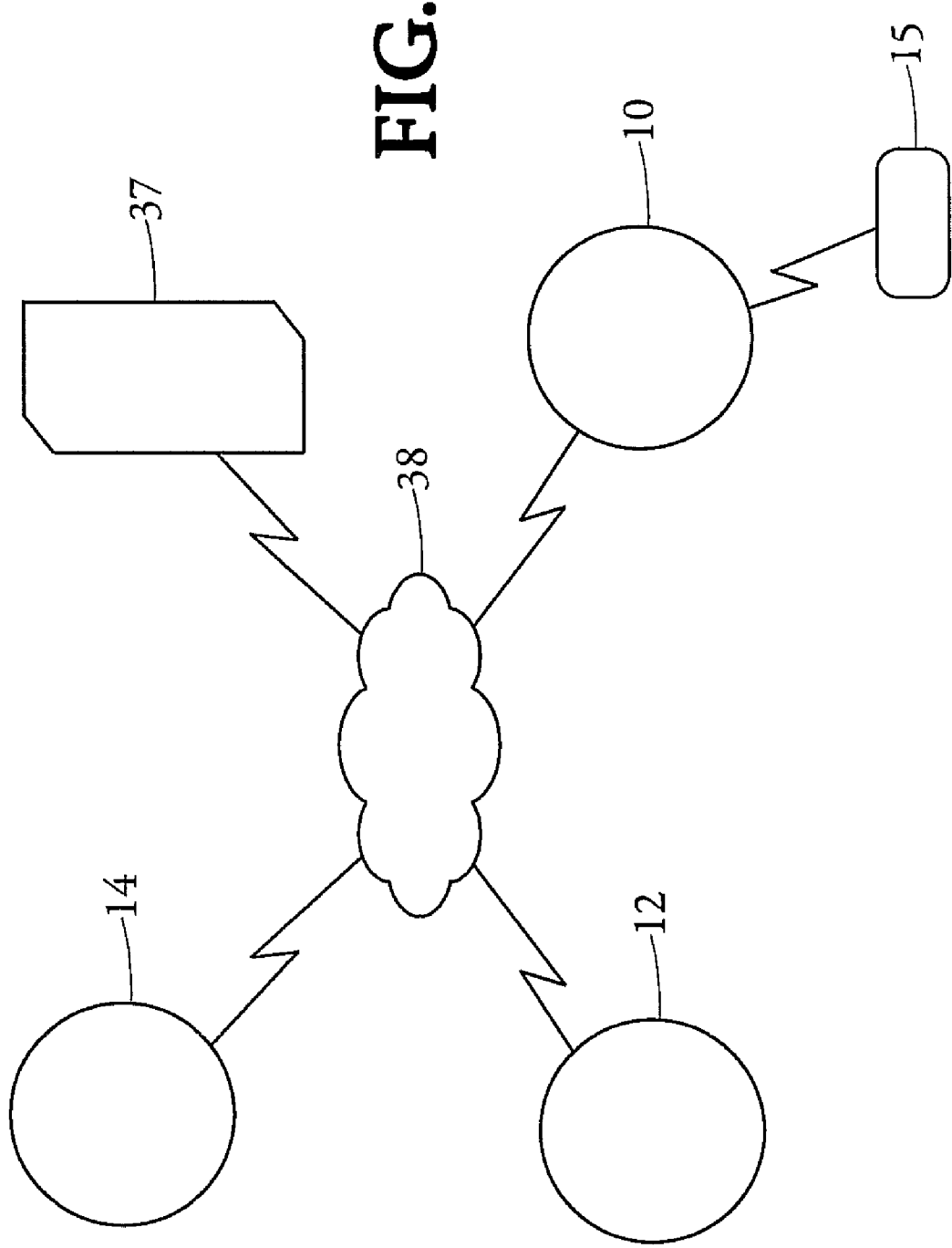
FIG. 7 is a schematic of a telepresence conference network in accordance with the invention.

Referring to FIG. 7, a telepresence conference may include a plurality of telepresence rooms/sites 10, 12, 14 and an LVC room 36, connected to a bridge telepresence room, such as telepresence room 10.

The telepresence conferencing equipment at each telepresence site 10, 12, 14 is preferably connected to a system operator 37 via a private or public network 38, such as the Internet. Preferably there exists alternate connections between the system operator 37 and each telepresence site 10, 12, 14, such as via dial-up modem connections and/or ordinary telephone connections (not shown). One of the telepresence rooms 10 may be a bridge to an LVC room 15, such that the other telepresence rooms 12, 14 in the conference connect to the LVC 15 through the bridge telepresence room 10.

Figure 8:
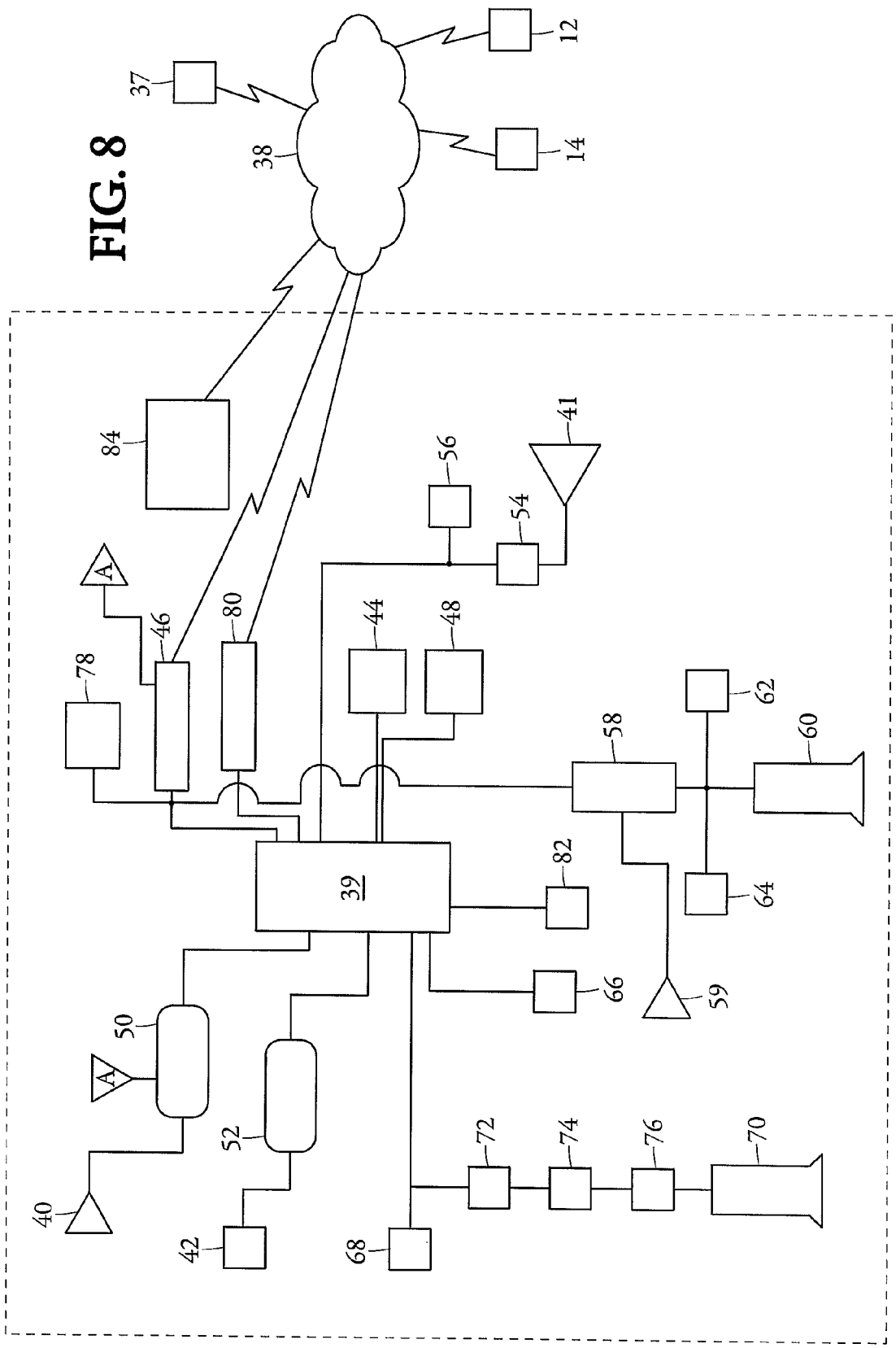
FIG. 8 is schematic of a telepresence site constructed in accordance with the invention.

Referring to FIG. 8, at the heart of each telepresence site is a remotely-configurable 16×16 Audio/Video matrix switch 39, which is connected to the network 38 and to which most other devices at the telepresence site are connected.

Each telepresence site also preferably includes:
- a plurality (e.g., four) of each of participant microphones 40, participant speakers 41, audio/video codecs 46, participant cameras 42, and participant displays 44 (the participant cameras and displays being in pairs), where each is connected to the 16×16 A/V matrix switch 39 (either directly or indirectly through other equipment) and where the A/V codecs 46 are connected to the network 38;
- if the participant displays and/or cameras are digital, they and the video ports of the codecs are connected to the 16×16 digital video matrix switch;
- an alternate presentation display 48 connected to the 16×16 A/V matrix switch 39;
- an audio processing unit 50 connected intermediate the participant microphones 40 and the 16×16 A/V matrix switch 39 and connected to the A/V codecs 46 (where the audio signals of the A/V codecs 46 are sent to a reference bus of the audio processing unit such that they are used as echo cancelling reference signals);
- a plurality of (e.g., four) VITC encoders 52 connected intermediate the participant cameras 42 and the 16×16 A/V matrix switch;
- if the participant cameras are digital, the VITC encoders are connected to digital-to-analog connectors, or to the VITC encoders and digital VITC encoders;
- a multi-channel (e.g., 4-channel) audio amplifier 54 connected intermediate the participant speakers 41 and the 16×16 A/V matrix switch;
- a plurality of (e.g., four) audio alarm relays 56 connected intermediate the multi-channel audio amplifier 54 and the 16×16 A/V matrix switch 39;
- an 8×1 diagnostic switch 58 having a plurality (e.g., four) incoming connections from the 16×16 A/V matrix switch 39;
- a diagnostic microphone 59 (or alternatively or additionally a signal from one of the participant microphones 40 prior to the audio processing unit 50) connected to an input of the 8×1 diagnostic switch 58;
- an audio server 60 connected to an output of the 8×1 diagnostic switch 58;
- an audio alarm relay 62 connected intermediate the audio server 60 and the 8×1 diagnostic switch 58;
- a audio meter graphic generator 64 connected intermediate the audio server 60 and the 8×1 diagnostic switch 58;
- a diagnostic test tone generator 66 (e.g, an oscillator) connected to the 16×16 A/V matrix switch 39;
- a room view camera 68 connected to the 16×16 A/V matrix switch 39;
- a single-source video server 70 connected to the room view camera 68 and to the 16×16 A/V matrix switch 39;
- a VITC code generator 72 connected intermediate the room view camera 68 and the single-source video server 70;
- a VITC code reader 74 connected intermediate the VITC code generator 72 and the single-source video server 70;
- a audio meter graphic generator 76 connected intermediate the room view camera 68 and the single-source video server 70;
- a multi-source video server 78 (e.g., four-source video server) connected to each of the audio/video codecs 46;
- an LVC codec 80 connected to the 16×16 A/V matrix switch 39;
- an audio program playback device 82 connected to 16×16 A/V matrix switch 39; and
- and integrated control system 84.

Audio Diagnostics

After the system has determined and provisioned the optimal connections between the various telepresence rooms, the system preferably performs several audio diagnostic procedures to confirm that all provisioned equipment and connections are operable. Certain audio diagnostic procedures may be preformed only once, or may be performed continuously (or periodically) during a conference.

The system preferably performs fully-automated diagnostic procedures between each telepresence room and every other telepresence room prior to the conference to verify that audio generated in each (source) room is received by the microphones in the source room, sent to all provisioned codecs in the source room, and then received and reproduced in all connected (target) rooms.

This test is performed in iterations and the system automatically determines the connections required for audio testing in each iteration, according to the previously provisioned connections. For example, if there are three telepresence rooms in a conference (R1, R2 & R3), the system may determine a testing procedure as follows:

| Iteration | Source Room | Target Room |
|---|---|---|
| 1 | R1 | R2 |
| 2 | R1 | R3 |
| 3 | R2 | R1 |
| 4 | R2 | R3 |
| 5 | R3 | R1 |
| 6 | R3 | R2 |

Figure 9:
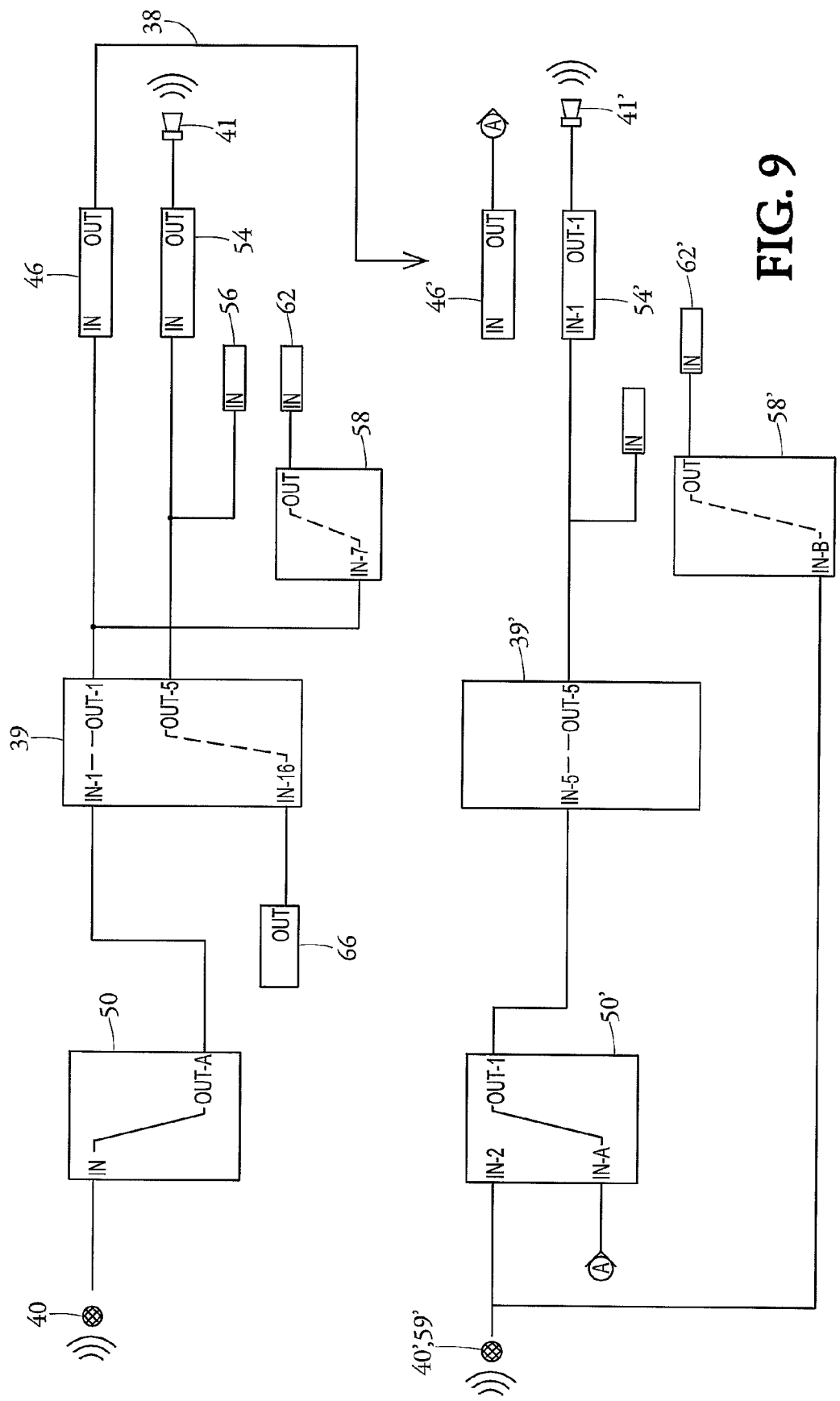
FIG. 9 is a schematic of audio diagnostic procedures conducted in accordance with the invention.

Referring to FIG. 9, the system preferably initially performs end-to-end tests, whereby the system generates a predetermined audio test signal in the source room (such as via the oscillator 66 at the source site), which is sent via the 16×16 A/V matrix switch 39 to one or more of the participant speakers 41 in the source room. (Optionally, an operator may speak into the room via the audio server). During each iteration, the system temporarily provisions (connects) one speaker 41 in the source room to the output signal from the audio player or oscillator 66 in the source room. The participant microphones 40 in the source room (if operating nominally) pick up the audio produced by the one speaker 41 and send the associated signal to the inputs of the codecs 46 in the source room, which send the signal to the other rooms in the conference (including the target room in the instant iteration of the test) via the network 38. Optionally, the system may cycle through speakers 41 in the source room one-by-one to test each speaker separately.

Nominally, the audio signal is then transmitted over the network 38 to the target room, is received by the associated codec 46' at the target site, and is reproduced in the target room via the audio processing unit 50', and via the participant speaker 41' in the target room associated with the source room. If the test audio signal is reproduced, a dedicated diagnostic microphone 59' in the target room (or a diagnostic feed from a participant microphone 40' prior to the audio processing unit 50') picks up the generated audio. An audio sensing relay 62' connected to the microphone 59'/40' sends an audio success signal to the integrated control system (not shown) at the target site upon receipt of the audio test signal from the assigned microphone. The system (or system operator) receives the audio success signal (or an indication thereof) from the control system at the target site, indicating a successful test.

If the audio test is successful, the system advances to the next iteration in the procedure until all iterations are completed. If an iteration of the end-to-end audio test is unsuccessful, the system preferably sends a notification to the system operator (identifying the failed connection) so that the system operator may take remedial action, such as re-provisioning the failed connection, re-setting the associated equipment, and/or using alternate equipment.

If one of the iterations in the end-to-end test fails, the system also preferably performs a series of mid-point tests to determine the point of failure in the audio signal flow. In a first (or one of) such mid-point tests, the system determines whether an audio sensing relay 62 connected to the input of the codec at the source site (the codec that has been provisioned for the target room) is receiving the audio test signal. Similar to the above, this audio sensing relay 62 sends an audio success signal to the control system at the source site upon receipt of the audio test signal at the input of the associated codec. The system (or system operator) receives the audio success signal (or an indication thereof) from the control system at the source site, indicating a successful test. If the first mid-point test is unsuccessful, the system preferably sends a notification to the system operator (identifying the location of the signal absence in the signal flow detected by the test).

Upon failure of the first mid-point test (or in addition thereto), the system determines whether an audio sensing relay 56 connected to the input of the audio amplifier 54 at the source site is receiving the audio test signal from the audio player/server and/or oscillator 66. As above, the system (or system operator) receives the audio success signal (or an indication thereof) from the control system at the source site, indicating a successful test, and, if the test is unsuccessful, the system preferably sends a notification to the system operator (identifying the location of the signal absence in the signal flow detected by the test).

It can be appreciated that the above two mid-point tests may be performed in a source-room only mode (prior to or after the provisioning of connections by the system), without the participation of the target room, since these two tests are performed entirely within the source site.

Upon failure of (or in addition to) the first two mid-point tests, the system determines whether an audio sensing relay 56' connected to the audio amplifier at the target site (at the input provisioned for the source room) is receiving the audio test signal from the source room. Here, the system (or system operator) receives the audio success signal (or an indication thereof) from the integrated control system (not shown) at the target site, indicating a successful test. Again, if the test is unsuccessful, the system preferably sends a notification to the system operator (identifying the location of the signal absence in the signal flow detected by the test). Also, while the above mid-point tests are preferably performed in the order discussed above, it can be appreciated that they may be performed in any order.

The system repeats the above end-to-end tests and, if necessary, mid-point tests for all iterations determined by the system. During such iterations, all provisioned speakers will be tested.

The system also provides for semi-automated testing which is initiated and controlled, in part, by the system operator. In a first semi-automated test, the operator uses the system to initiate the playback of a pre-recorded audio program (such as a musical or spoken word audio program) in a source room to determine if the audio signal is reaching a target room and is being reproduced in the target room. During this test, the system operator directs an audio playback device 82 and/or the audio server at the source site to generate the audio program and the system operator directs the system to temporarily connect one speaker 41' in the target room to the output signal from the audio server (not shown) in the target room.

A human operator may be used as a local observer to confirm that the audio is reproduced in the target room. Alternatively, the system operator (or another off-site observer) may dial-in to the audio server at the target site (using a common telephone) to ascertain (audibly) the status of the audio signal flow to and within the target site. With the 8×1 switch 58' at the target site set to connect the audio server at the target site to the input of the codec 46' associated with the source room, the remote observer can determine whether the audio signal is reaching that codec. In addition, with the 8×1 switch 58' at the target site may be set to connect the audio server at the target site to the diagnostic microphone 59' at the target site (or one of the participant microphones 40'), the remote observer can determine whether the audio signal is being reproduced within the target room.

The system also preferably provides an audio meter graphic for remote visual monitoring of audio signal reproduction in the target room. Preferably, the diagnostic microphone 59' is connected to an on-screen audio meter at the target site, which is in turn connected to the video server at the target site. The audio meter graphic is a moving-bar graphic which is overlayed upon the image from the room view camera in the target room, which may be viewed by accessing the video server at the target site. Thus, the remote operator may visually monitor the audio signal reproduction in the target room by viewing the movement (or non-movement) of audio meter graphic.

Preferably, the audio meter graphic has two channels, one of which indicates the output of the is 8×1 switch and the other of which indicates the output of the diagnostic microphone (or participant microphone) at the target site. Thus, the audio meter graphic permits the remote operator to monitor the audio signal at separate locations in the signal flow from the diagnostic microphone, both downstream and upstream of the 8×1 switch.

The system also preferably provides for manual monitoring of audio signals via ordinary telephone dial-in to the audio processing unit (echo canceller) at the target site which allows a remote operator to listen in to the combined audio signals from the local and remote rooms. As an alternative to monitoring the combined audio signals, the system preferably permits the remote operator to select which audio signal or signals to monitor by allowing the remote operator to selectively mute and unmute any signal entering the audio processing unit, so signals can be isolated as desired.

Audio signals going to the audio server are selected by the 8×1 switch. The options are diagnostic microphone, participant microphones with phone dial-in mixed in, and A/V codec outputs.

Video Diagnostics

After the system has determined and provisioned the optimal connections between the various telepresence rooms, the system preferably performs or permits several video diagnostic procedures to confirm that all provisioned equipment and connections are operable. Certain video diagnostic procedures may be preformed only once, or may be performed continuously (or periodically) during a conference.

Figure 10:
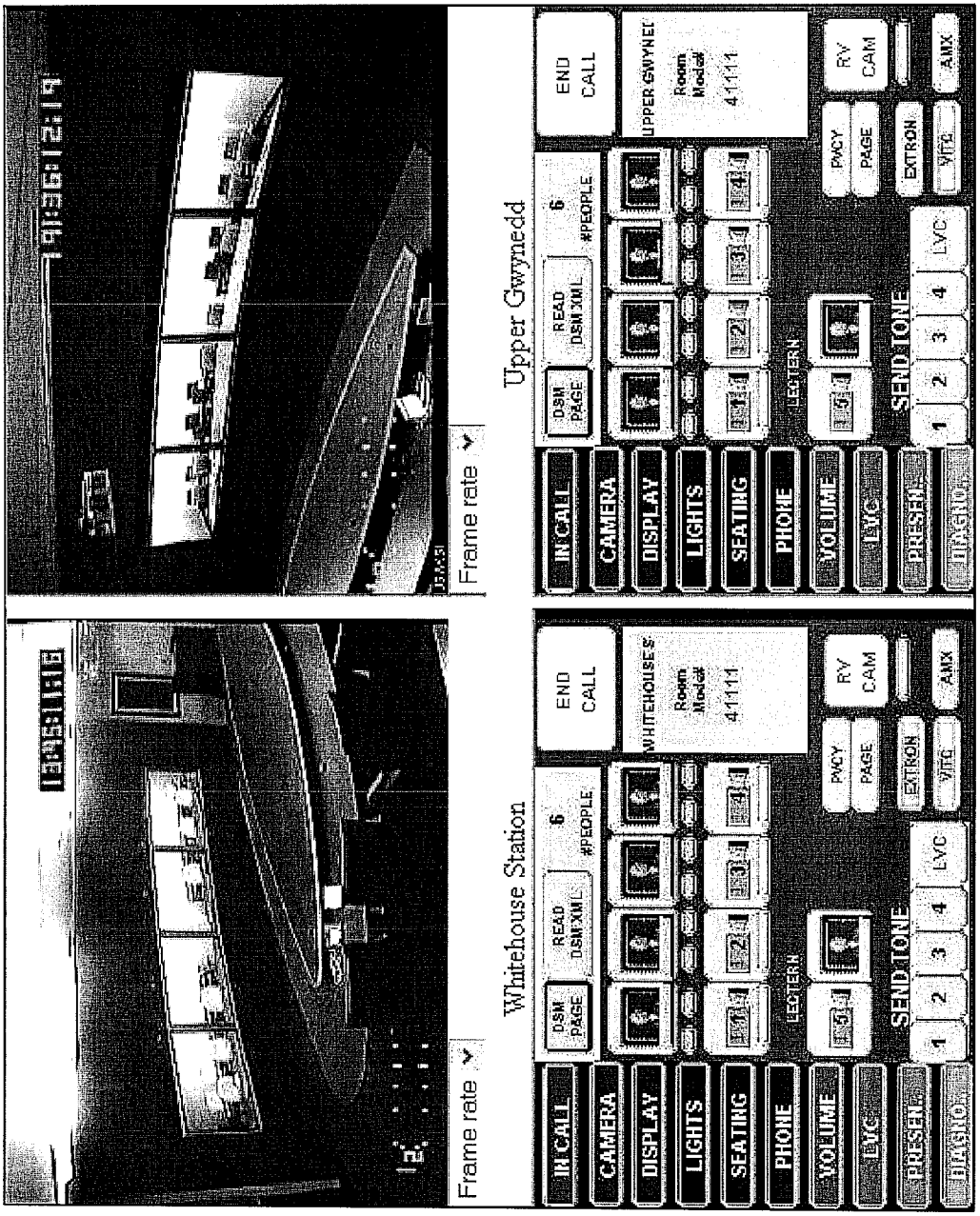
FIG. 10 is a screen-shot of a display of the remote operator control panel and single-source video diagnostic display in accordance with the invention.

Referring to FIG. 10, the system preferably permits the remote operator to monitor single video sources in a partially automated manner. To do so, the remote operator may access the single-source video diagnostic server of at the selected site remotely, via the network. The remote operator can select and view a desired video source, such as the video signal from the room view camera (as depicted in FIG. 10) or the signal from one of the local or remote participant cameras. The room view camera shows a real-time view of the entire (local) room, including the images on all (local) participant displays and the (local) alternative presentation display, along with the audio meter graphic overlay and an overlay of the embedded VITC code of the room view camera signal. Thus, the remote operator can quickly ascertain whether all of the local displays are operating nominally.

To monitor the video signal from one of the local or remote participant cameras, the system operator directs the 16×16 matrix switch at the local site to connect the desired video source to the single-source video diagnostic server. This permits the remote operator to monitor the real-time output of the selected video source (as received by the 16×16 matrix switch), along with the (local) audio meter graphic overlay and an overlay of the VITC code embedded in the selected video source.

The system also preferably permits the remote operator to monitor the composite participant display in the local room in a partially automated manner. To do so, the remote operator may access the four-source video diagnostic server at the local site remotely, via the network. The four-source video diagnostic server presents a simulation of the composite participant display of the local room showing, in real-time, the signals being sent to all (e.g., all 4) local participant displays, side-by-side, in their physical order. Thus, in this manner, the remote operator may confirm that the signals are being sent to all provisioned local participant displays and that the images are in a correct physical order.

As can be appreciated, the above video diagnostic procedures may be performed at any time, including before and during a conference.

Preferably, the system also provides for fully-automated monitoring of VITC codes embedded in video signals to determine whether video streams are being generated and received nominally (i.e., continuously). Preferably, the local integrated control system notifies the remote operator when any provisioned video stream is interrupted for more than a predetermined amount of time (e.g., for more than about 30-60 seconds). Such notification may be in the form of an automated email message transmitted from the local site to the remote operator, over the network.

During this procedure, the integrated control system at the local site connects the single-source video diagnostic server to each provisioned video source, one-at-a-time, for a predetermined amount of time, via the 16×16 A/V Matrix switch. During each connection, the video diagnostic server reads the embedded VITC codes (which should be progressing) and sends them to the integrated control system at the local site. If the integrated control system determines that the VITC code is not progressing for more than a predetermined period of time, the integrated control system sends a message to the remote operator indicating that the video source has been interrupted (e.g., an email message). This test may be done once (at conference initiation) or continuously (during the conference).

The system also preferably includes video sensors positioned over a small (e.g., corner) portion of the active area of each participant display and the alternative presentation display, which sensors are connected to the integrated control system. The integrated control system includes a video test pattern generator operable to generate a predetermined test pattern (such as alternating white/black 3 times, or another suitable test pattern), which may be displayed over the entire display or a portion of the display covered by the video sensor.

The system directs the generated test pattern to a particular display via the 16×16 A/V matrix switch. The integrated control system determines that the particular display is operating nominally if it receives the expected test pattern signal from the associated video sensor on the display.

The remote operator may initiate this test remotely at any time for any display. Prior to, or upon the initiation of the conference, the system may initiate a fully-automated test of all displays, by sequentially testing each display. During the conference, the integrated control system (or the conference system) may periodically initiate a test of each display.

Control Systems

Each telepresence site preferably has an integrated control system which is operable to (automatically or at the direction of the remote operator) configure and monitor various equipment and connections at the local site. Specifically, the integrated control system is operable to:

configure the connections within the 16×16 A/V matrix switch,
continuously monitor, during a conference, the configuration of the 16×16 A/V matrix switch to detect and correct any changes (and send a message to the remote operator if any change is detected),
configure the connections within the 8×1 audio switch,
receive video & data output from the single-source video diagnostic server (however, the single-source server is preferably accessible by way of a web browser, which displays the image from the video diagnostic server adjacent to a control panel for the integrated control system to permit the remote user to operate the control system while viewing the desired signals),
initiate the generation of the testing tone or audio program playback which is audible with the audio diagnostic server,
receive signals from all (5) audio alarm relays,
adjust PTZ and track position of participant cameras (and PTZ of any document camera),
adjust settings of participant and alternative presentation displays (via wired (e.g., RS232) and/or wireless (e.g., infra-red) signals),
adjust settings of outputs of the audio processing unit (e.g., volume of each channel),
adjust lighting,
control window shades,
receive signals from the touch panel control,
run a one-time script to verify that all equipment connected to the integrated control system via wired (e.g., RS232) connections are responsive,
continuously monitor, during a conference, all equipment connected to the integrated control system via wired (e.g., RS232) connections to verify that the equipment remains responsive (and send a message to the remote operator if any is non-responsive), and
remotely power cycle equipment at the local site, one at a time (the power of the integrated control system be cycled using an Ethernet-based remote power controller).

Certain equipment at each site may also be controlled directly by the remote operator via the network (over Ethernet), including the:
audio processing unit,
16×16 AV matrix switcher,
8×1 audio switcher,
remote power controller,
single-source video audio server,
four-source video server,
presentation system,
rack PC,
Audio/Video codecs,
LVC codec, and
collateral reproduction system.

The system preferably also includes redundant wired (e.g., RS232) connections to certain equipment accessible remotely via the network via Ethernet. Such Ethernet equipment may also have a redundant control connection to a computer via a serial connection (RS232), which computer may be accessed remotely via modem in the event that the Ethernet connection is unavailable. Such equipment preferably includes the:
audio processing unit,
integrated control system,
remote power controller,
presentation system,
rack PC,
Audio/Video codecs, and
LVC codec.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

What is claimed:

1. A method of conducting an audio-visual telepresence conference among at least three conference rooms distributed over various locations, each conference room having a number of participants and a number of participant displays, the method comprising:
    (a) assigning a relative priority for each room in the conference, based on the number of operable participant displays in the room, where each room is assigned a different priority;
    (b) determining a number of audio-video streams between each room in the conference and every other room in the conference, beginning with a room having the highest priority and ending with a room having the lowest priority;
    (c) in each room in the conference, assigning a participant display/camera pair to every other room in the conference;
    (d) generating a configuration script for each room in the conference to automatically configure teleconference devices; and,
    (e) transmitting a configuration script to each room in the conference.

2. The method of conducting an audio-visual telepresence conference, as in claim 1, wherein:
    (a) determining whether each room in the conference has at least one operable participant camera for every other conference room included in the conference;
    (b) determining whether each room in the conference has at least one operable participant display for every other conference room included in the conference; and
    (c) determining whether each non-initiating room in the conference has at least one operable alternative presentation display, if the conference includes an alternative presentation from an initiating room.

3. The method of conducting an audio-visual telepresence conference, as in claim 1, wherein:
    (a) in the step of determining a number of audio-video streams between each room in the conference and every other room in the conference, the number of audio-video streams is first determined between the room with the highest priority and the room with the second-highest priority, and then between the room with the highest priority and the third-highest priority, and subsequently until the number of audio-video streams between the room with the highest priority and all other lower-priority rooms is determined;
    (b) then, the number of audio-video streams is determined between the room with the second-highest priority and the third-highest priority, and subsequently until the number of audio-video streams between the room with the second-highest priority and all other lower-priority rooms is determined; and
    (c) then, the number of audio-video streams is determined between subsequent lower-priority rooms is determined in a recursive manner similar to (b) above.

4. The method of conducting an audio-visual telepresence conference, as in claim 1, wherein:
  (a) each room in the conference has a composite participant display comprising a plurality of individual participant displays disposed adjacent one another; and
  (b) in the step of assigning a participant display/camera pair to other rooms in the conference, the participant display/camera pair in the highest priority room are assigned to the other rooms in the conference beginning from one side of the composite participant display to another side thereof, in the order of the priority of the other rooms in the conference.

5. The method of conducting an audio-visual telepresence conference, as in claim 4, wherein:
  (a) a left-most active participant display/camera pair in the room having the highest priority is assigned to the right-most active participant display/camera pair in the room having the second-highest priority; and
  (b) subsequent assignment of unassigned participant display/camera pairs in the rooms is performed from left-to-right in an order of priority of the lower-priority rooms.

6. The method of conducting an audio-visual telepresence conference, as in claim 1, further comprising:
  (a) performing automatic audio diagnostic procedures between each room in the conference to verify that audible sounds generated in any source room in the conference are received by microphones in the source room, sent to all provisioned codecs in the source room, and then received and reproduced in every other room in the conference.

7. The method of conducting an audio-visual telepresence conference, as in claim 1, further comprising:
  (a) performing audio diagnostic procedures between each room in the conference to verify that audible sounds generated in any source room in the conference are reproduced in every other room in the conference;
  (b) said audio diagnostic procedures include an end-to-end test wherein an audible test signal is generated in a source room to determine whether the audible test signal is successfully generated in a target room of the conference;
  (c) said audio diagnostic procedures include a first mid-point test to determine whether an input for a codec in the source room assigned to the target room is receiving the test signal;
  (d) said audio diagnostic procedures include a second mid-point test to determine whether an input for an amplifier in the source room is receiving the test signal; and
  (e) said audio diagnostic procedures include a third mid-point test to determine whether an input for an amplifier in the target room is receiving the test signal.

8. The method of conducting an audio-visual telepresence conference, as in claim 1, further comprising:
  (a) automated monitoring of a video source in the conference by embedding a VITC code in a video stream of the video source and periodically determining whether the VITC code is progressing.

9. The method of conducting an audio-visual telepresence conference, as in claim 1, further comprising:
  (a) providing a remotely-manageable switch at a site of each conference room;
  (b) providing a remotely-accessible video diagnostic server at a site of each conference room;
  (c) a conference operator directing the switch to connect a video source in the associated room to the video diagnostic server; and
  (d) the conference operator remotely connecting to the video diagnostic server and determining whether the connected video source is operating.

10. The method of conducting an audio-visual telepresence conference, as in claim 1, where relative priority for each room in the conference is assigned based primarily on the number of operable participant displays in the room and secondarily on the number of participants in the room, where each room is assigned a different priority.

* * * * *